(12) United States Patent
Shikata et al.

(10) Patent No.: US 6,397,609 B1
(45) Date of Patent: Jun. 4, 2002

(54) VEHICLE AIR-CONDITIONING SYSTEM WITH ARRANGEMENT OF ELECTRICAL MEMBER

(75) Inventors: Kazushi Shikata, Kariya; Teruhiko Kameoka, Okazaki; Shigeki Harada, Toyota; Akihiro Hayakawa, Tokai; Hikaru Sugi, Nagoya; Akira Yamaguchi, Chiryu; Hiroyuki Tomita, Nagoya; Koichi Ito, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/634,829

(22) Filed: Aug. 9, 2000

(30) Foreign Application Priority Data

| Aug. 20, 1999 | (JP) | ............................................. 11-234200 |
| May 15, 2000 | (JP) | ........................................ 2000-141197 |
| Jun. 1, 2000 | (JP) | ........................................ 2000-164032 |

(51) Int. Cl.⁷ .............................. F25D 23/12; F28F 7/00
(52) U.S. Cl. ......................... 62/179; 62/259.2; 361/701; 454/69
(58) Field of Search ............................... 62/259.2, 179; 454/69, 127; 165/80.3; 361/690, 701

(56) References Cited

U.S. PATENT DOCUMENTS

| 5,481,885 A | * | 1/1996 | Xavier et al. ............. 454/69 X |
| 5,715,140 A | * | 2/1998 | Sinkunas et al. ........... 261/690 |
| 5,966,951 A | * | 10/1999 | Mälhammar et al. ...... 62/259.2 |

FOREIGN PATENT DOCUMENTS

| JP | U-62-117480 | 7/1987 |

* cited by examiner

Primary Examiner—William Wayner
(74) Attorney, Agent, or Firm—Harness, Dickey & Pierce, PLC

(57) ABSTRACT

In a vehicle air-conditioning system, plural electrical members such as a blower controller, servomotors and a post-evaporator temperature sensor are collectively disposed on an electrical circuit board integrally formed with an evaporator case cover for closing a side surface of an evaporator case. Therefore, a wire structure of an electrical connection or a wire harness can be made simple. Further, because an elastically deformable sensor-pressing portion for pressing the post-evaporator sensor toward an evaporator side surface is integrally formed with the evaporator case cover integrated with the electrical circuit board, a contact pressure of a temperature sensitive portion of the post-evaporator sensor onto the evaporator side surface can be maintained.

26 Claims, 15 Drawing Sheets

VEHICLE AIR-CONDITIONING SYSTEM WITH ARRANGEMENT OF ELECTRICAL MEMBER

CROSS-REFERENCE TO RELATED APPLICATION

This application is related to and claims priority from Japanese Patent Applications No. Hei. 11-234200 filed on Aug. 20, 1999, No. 2000-141197 filed on May 15, 2000, and No. 2000-164032 filed on Jun. 1, 2000, the contents of which are hereby incorporated by reference.

BACKGROUND OF THE INVENTION

1. Field of the Invention

The present invention relates to a vehicle air-conditioning system provided with an air-conditioning unit for controlling temperature of a passenger compartment. More particularly, the present invention relates to a vehicle air-conditioning system collectively arranging, at least equal to or more than one piece of electrical members such as a blower controller and sensors used for an air-conditioning on an electrical circuit board on which a microcomputer including functions at least CPU, a memory and the like is mounted. Further, the electrical circuit board is integrally mounted with the air-conditioning unit.

2. Description of Related Art

In a conventional vehicle air-conditioning system described in JP-U-62-117480, even when a temperature sensitive portion of a thermal-switch is failed, maintenance of the failed portion can be easily performed without removing an evaporator by providing a cover body on a side surface of an evaporator case for containing the evaporator of a refrigerating cycle, and by installing the thermal-switch having the temperature sensitive portion for sensing temperature of the evaporator in the cover body.

Further, in a general air-conditioning system for a vehicle, as illustrated in FIG. 18, the system is provided with an air-conditioning unit 100 for air-conditioning inside a passenger compartment and an air-conditioning ECU 110 for controlling respective component of the air-conditioning unit 100. In the meantime, the air-conditioning unit 100 has an evaporator case 101 for forming an air passage through which air flows. A blower, an evaporator, a heater core, an air mix door, and a mode switching door are disposed inside the evaporator case 101. Further, a cover body 103 having a connecting port 102 coupled to the blower is attached to a side surface of the evaporator.

Further, the air-conditioning ECU 110 is a device in which the well known microcomputer constructed by including functions, for example, CPU, memories (ROM and RAM), an input/output circuit and the like, is mounted on one board (an electrical circuit board) called a PC board (a printed circuit board). Based on sensor signals from control sensors such as a post-evaporator temperature sensor 104 and switch signals from various switches installed in an air-conditioning operation panel 105, a blower controller 106 for driving the blower, a servomotor 107 for driving the air mix door, and a servomotor 108 for driving the mode switching door are controlled.

Electrical members such as the post-evaporator temperature sensor 104, the air-conditioning operating panel 105, the blower controller 106 and the servomotors 107 and 108, are installed respectively independently in an interior portion or in the vicinity of an instrument panel. With this arrangement, respective electrical members for controlling the air-conditioning unit are electrically connected with one another by means of a plurality of pieces of wire harness 109.

However, in the vehicle air-conditioning system disclosed in JP-U-62-117480, since only one piece of the thermo-switch is provided on the cover body, no effect can be is found such as a decrease in the number of electrical wires of the wire harness 109 and space saving.

Further, in the conventional vehicle air-conditioning system as illustrated in FIG. 17, since the electrical members for controlling air-conditioning operation are conducted by means of a plurality of pieces of the wire harness 109 so that the air-conditioning ECU 110 is electrically connected to various sensors or to various switches, the number of electrical wires of the wire harness is increased. Therefore, a mounting space of the system on a vehicle becomes larger, assembling steps becomes larger, and the system is manufactured in a high cost.

In addition, heat-generating members such as the blower controller 106 are mounted to protrude in an interior portion of the evaporator case 101 by opening holes therein so that the heat-generating members is made in contact with cold air cooled by the evaporator. However, according to their mounting positions, there cause an increase in noise due to a draft resistance or the like. On the other hand, when the heat-generating members are mounted on the evaporator case 101 so as not too much to be protruded inside the air passage, the heat-generating members are not effectively cooled, and operation performance of the heat-generating members may be decreased.

SUMMARY OF THE INVENTION

It is an object of the invention is to provide an air-conditioning system for a vehicle, in which the number of electrical wires of a wire harness connecting control circuit members to an electrical member, for performing signal input/output operation between the control circuit members, can be reduced and an attachment space can be reduced.

It is an another object of the invention is to provide an air-conditioning system for a vehicle possible to be decreased in manufacturing cost by reducing assembling steps of air-conditioning control circuit members and electrical members.

It is a further object of the invention to provide an air-conditioning system for a vehicle capable of securing contact pressure of a temperature sensitive portion of a temperature sensor to a side surface of an evaporator.

It is a still further object of the invention to provide an air-conditioning system for a vehicle, in which components are readily attached with improved maintenance performance.

According to a first aspect of the present invention, in a vehicle air-conditioning system, a plurality of control circuit members having at least functions of CPU and memory are mounted on the electrical circuit board disposed integrally with an air duct of an air-conditioning unit, and an electrical member which electrically operates when electrical power is applied thereto is mounted to the electrical circuit board to perform signal input/output operation between the control circuit members. Therefore, wire number of wire harness connecting the control circuit members and an at least one of electrical parts of the electrical member can be reduced, and attachment space of the vehicle air-conditioning system can be reduced. Accordingly, assembling steps of at least one of the electrical parts of the electrical member and the control circuit members can be reduced, and production cost of the vehicle air-conditioning system can be reduced.

Preferably, the electrical circuit board is attached to a side surface of a cooling heat exchanger. For example, the electrical circuit board is attached at a detachable side of an interior fluid pipe of the cooling heat exchanger. Therefore, a detaching operation of the cooling heat exchanger and a change of the electrical member can be readily performed in one side direction.

According to a second aspect of the present invention, a vehicle air-conditioning system includes a cooling heat exchanger for cooling heat exchanger for cooling air blown into a passenger compartment, a cooler case for accommodating the cooling heat exchanger therein, a case cover disposed in the cooler case at a side of the evaporator to cover an operation window opening of the cooler case, a temperature sensor having a temperature-sensitive portion disposed to contact a side surface of the cooling heat exchanger, and an electrical circuit board. On an electrical circuit board, a plurality of control circuit members having at least functions of CPU and memory, and an electrical member which electrically operates when electrical power is applied thereto and performs signal input/output operation between the control circuit members collectively are mounted. The electrical circuit board is disposed integrally with an exterior wall surface of the case cover, and the temperature sensor is mechanically attached to the electrical circuit board to be electrically connected with at least any one of the control circuit members and the electrical member. Thus, in the collective arrangement of the control circuit members and the electrical member, a peripheral temperature of the case cover is not affected to the temperature sensitive portion of the temperature sensor, and the temperature sensor can accurately detect the side temperature of the cooling heat exchanger.

Preferably, the case cover includes a sensor-pressing portion for pressing the temperature sensitive portion toward the side surface of the cooling heat exchanger, and the sensor-pressing portion is disposed between an interior wall surface of the case cover and the temperature sensitive portion to be elastically deformed. Therefore, a contact pressure of the temperature sensitive portion of the temperature sensor to the side surface of the cooling heat exchanger can be maintained.

According to a third aspect of the present invention, a housing is formed separately relative to an air duct made of a first resin material, and the housing is made of a second resin material having a thermal contraction smaller than that of the first resin material. Therefore, the housing is hardly deformed during molding. Thus, when plural control circuit members and at least one electrical member are collectively disposed within the housing, an axial engagement of an actuator such as a servomotor can be made simple, for example. Thus, the air-conditioning system is readily assembled and improves maintenance performance.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF PREFERRED EMBODIMENTS

Figure 1B:
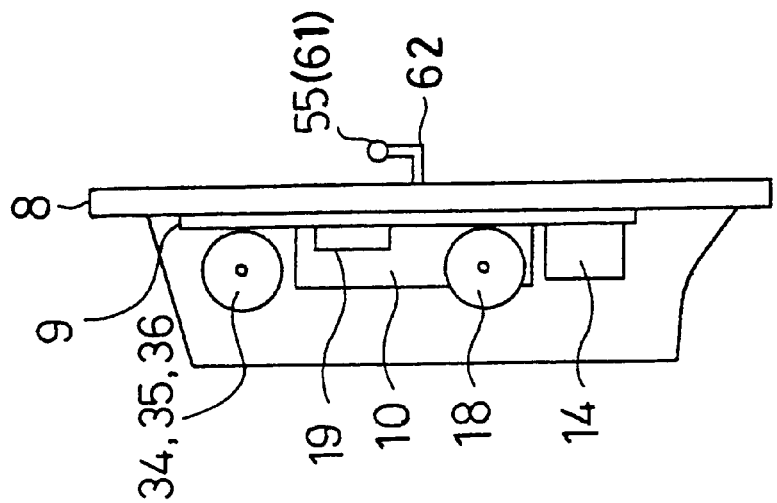
FIG. 1B is a side view illustrating the evaporator case cover having the electrical circuit board according to the first embodiment.

Referring to the drawings, preferred embodiments of the present invention will be described.

A first preferred embodiment of the present invention will be now described with reference to FIGS. 1–5. A vehicle air-conditioning system is provided with a semi-center type air-conditioning unit 1 arranged within a center console inside a passenger compartment and an air-conditioning control unit (hereinafter, referred to as an air-conditioning ECU) 10. The air-conditioning ECU 10 is constituted by mounting a microcomputer 90 on an electrical circuit board 9. The microcomputer 90 (i.e., control circuit members of the present invention) electrically controls air-conditioning components (e.g., actuators) assembled in the air-conditioning unit 1, and automatically controls temperature inside the passenger compartment and a supply air quantity.

The air-conditioning unit 1 includes an air-conditioning duct 3 forming an air passage 2 in an interior portion thereof. The air-conditioning duct 3 is, for example, integrally molded out by a polypropylene resin (PP). Further, an interior/exterior air switching unit for switching an interior/exterior air (suction opening) mode and a centrifugal blower (not shown) for generating an air stream directing toward inside the passenger compartment are connected to the air-conditioning duct 3 at an air upstream side thereof.

Figure 4:
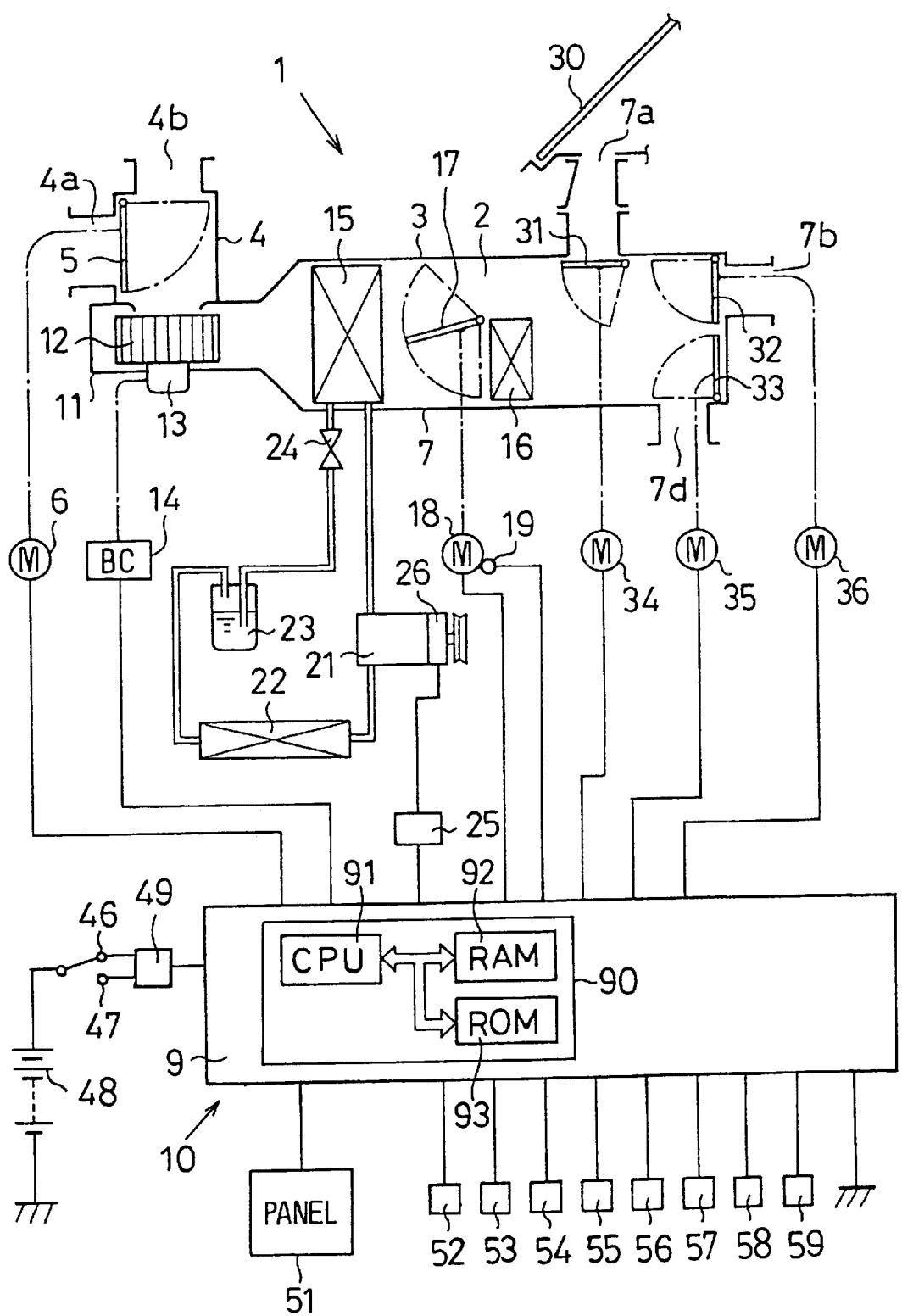
FIG. 4 is a schematic view illustrating an entire structure of a vehicle air-conditioning system according to the first embodiment.

As shown in FIG. 4, the interior/exterior air switching unit includes an interior/exterior air switching box 4 having an interior air suction opening 4a for sucking air inside the passenger compartment (hereinafter, it is called interior air) and an exterior air sucking opening 4b for sucking air outside the passenger compartment (hereinafter, it is called exterior air), an interior/exterior air switching door 5 for changing over the interior/exterior air mode by selectively opening/closing the interior air sucking opening 4a or the exterior air suction opening 4b, and a servomotor 6 as an actuator for driving the interior/exterior air switching door 5.

The centrifugal blower includes a scroll case 11 connected to a downstream air side of the interior/exterior air switching unit, a centrifugal fan 12 freely rotatably contained inside the scroll case 11, a blower motor 13 for rotatably driving the centrifugal fan 12, and a blower driving circuit (hereinafter, referred to as a blower controller) 14 for controlling a current carried in the blower motor 13. The scroll case 11 has a suction port in a shape of bell mouth, from which air is sucked into the centrifugal fan 12.

The air-conditioning duct 3 is provided at a downstream air side thereof with a blow outlet switching unit for switching a blow outlet mode. The blow outlet switching unit is formed in an evaporator case (it is also called a heater case) 7 as a cooler unit case to have a blow outlet switching box. An evaporator 15, a heater core 16, and an air mixing (A/M) door 17 are disposed inside the evaporator case 7.

First, the evaporator 15 is a cooling heat exchanger for cooling air by performing heat exchange between air flowing inside the air-conditioning duct 3 and refrigerant, and is one of elements constructing a refrigerating cycle of the vehicle air-conditioning system. The refrigerating cycle of the first embodiment is constructed in such a manner that refrigerant is circulated from a compressor 21 via a condenser 22, a receiver 23, an expansion valve 24, and the evaporator 15. In the meantime, the compressor 21 is rotatably driven by rotational power of a vehicle engine transmitted via an electromagnetic clutch 26 in which a carried current is controlled by means of a compressor drive circuit 25.

The heater core 16 is a heating heat exchanger for heating air flowing inside the air-conditioning duct 3 by utilizing cooling water of the engine of the vehicle as a heat source for heating and by performing heat exchange between air and the cooling water. Further, the A/M door 17 adjusts temperature of air blown into the passenger compartment by adjusting air quantity passing through the heater core 16 and air quantity bypassing the heater core 16 according to a door opening degree set by means of a servomotor 18 as a second actuator. Here, the servomotor 18 is provided with a potentiometer (corresponding to a position detecting means of the present invention) 19 for detecting opening degree of the A/M door 17 and is connected to an input terminal of the microcomputer 90 of the air-conditioning ECU 10.

At a downstream air side of the evaporator case 7, a defroster (DEF) air outlet 7a, of a center face (FACE) air outlet 7b, of a side face (FACE) air outlet 7c, of a front foot (FOOT) air outlet 7d, and of a rear foot (FOOT) air outlet 7e are formed.

The defroster air outlet 7a is an air outlet for blowing conditioned air (mainly, warm air) toward an inner surface of a windshield glass 30 inside the passenger compartment. The face air outlets 7b and 7c are air outlets for blowing conditioned air (mainly, cold air) toward the head and breast portions of a passenger in the passenger compartment. The foot air outlet 7d is an air outlet for blowing conditioned air (mainly, warm air) toward a feet portion of a passenger sitting on vehicle front seats, and the foot air outlet 7e is an air outlet for blowing conditioned air (mainly, warm air) toward a feet portion of a passenger sitting on vehicle rear seats.

Figure 5:
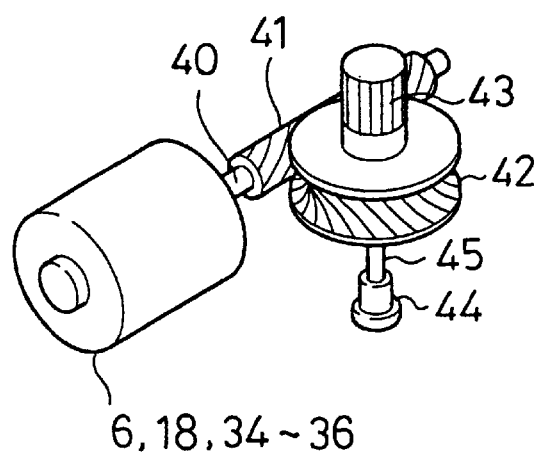
FIG. 5 is a perspective view illustrating a reduction gear mechanism of a servomotor according to the first embodiment.
Figure 3:
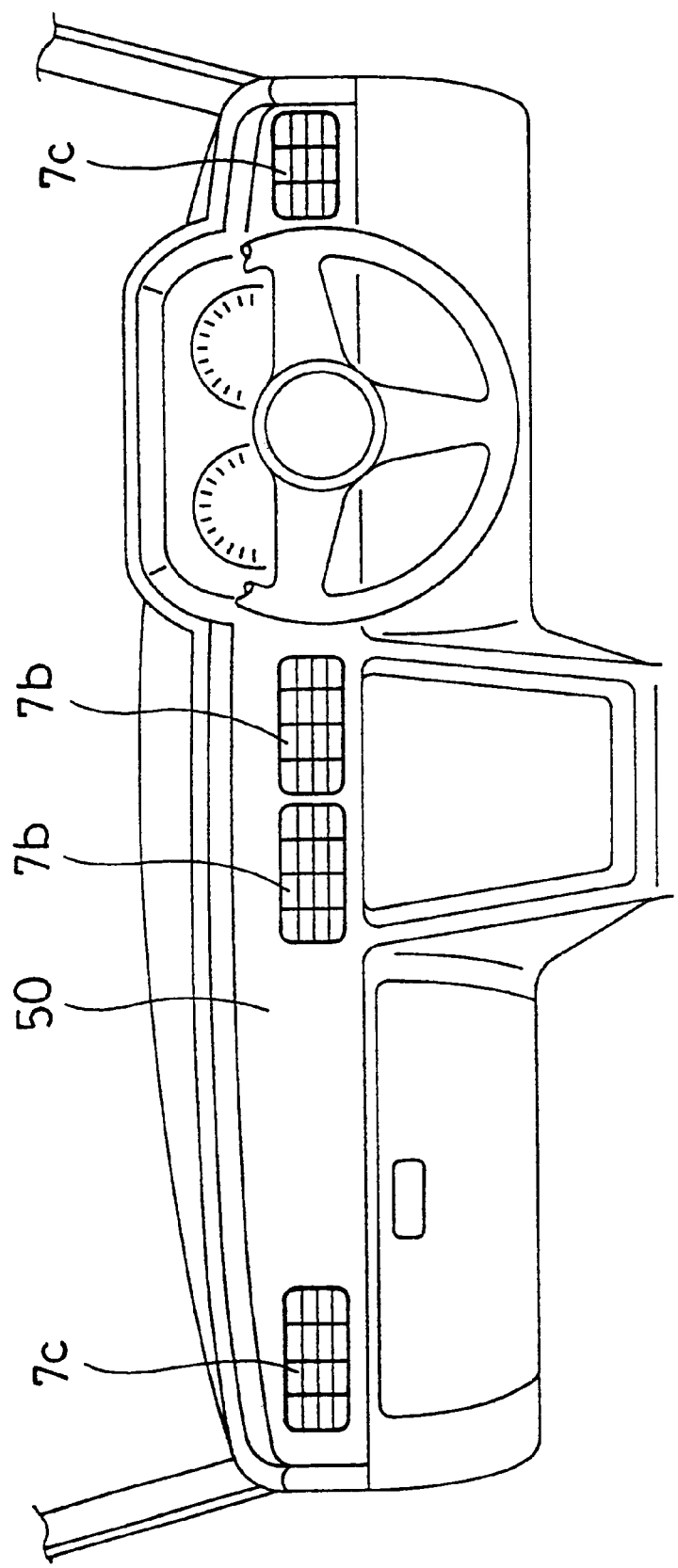
FIG. 3 is a front view illustrating an instrument panel of a vehicle according to the first embodiment.

Further, at least, the defroster air outlet 7a, the face air outlet 7b and the foot air outlet 7d are provided so as to be selectively opened/closed by means of mode switching doors 31–33. These mode switching doors 31–33 are driven by servomotors 34–36 as first actuators. Here, gear reduction mechanisms illustrated in FIG. 5 are provided in the servomotors 6, 18, 34–36, respectively.

In the gear reduction mechanism, a worm gear 41 is attached to a rotary shaft 40 of the servomotors 6, 18, 31–33, respectively. The worm gear 41 is meshed with a helical gear 42. Further, the helical gear 42 is integrally molded on an output side thereof with a spur gear 43. In the meantime, a numeral 44 designates a bearing portion for freely and rotatably supporting a rotary shaft 45 of the helical gear 42 and the spur gear 43.

The air-conditioning ECU 10 is operated when an ignition switch (IG-S/W) 46 or an accessory switch (ACC-S/W) 47 is turned ON. The air-conditioning ECU 10 is constructed by a microcomputer (one board computer) 90 for controlling air-conditioning operation. The microcomputer 90 includes functions such as CPU (a central processing unit having an operation portion, a control portion, and a register portion), ROM (a read only memory), RAM (a random access memory), an input/output circuit (an I/O port), an A/D converting circuit (an A/D converter), and a timer circuit. The microcomputer 90 is a component of an air-conditioning control circuit of the present invention, is constructed by an integrated circuit used for an air-conditioning control or an electronic circuit used for an air-conditioning control, and is covered by an ECU cover (not illustrated).

In the first embodiment, a multi-chip microcomputer in which these entire functions are constructed of a plurality of pieces of LSI is utilized as the microcomputer 90. Therefore, in the microcomputer 90, a plurality of pieces of LSI constructed by at least of CPU, ROM, RAM, and an I/O port are mounted on the one-piece electrical circuit board 9, that is, a PC board (a printed circuit board). The plurality of pieces of LSI are LSI (91) forming one chip CPU (microprocessor), LSI (92 and 93) constructed by memories (ROM, RAM), and LSI forming the input/output circuit (the I/O port) and the like.

The blower controller 14, the compressor drive circuit 25 and the servomotors 6, 18, 34–36 are connected to an output terminal of the microcomputer 90. Since the microcomputer 90 and its periphery circuit are so provided as to move by +5V, the microcomputer 90 has an electrical source circuit 49 in which a battery 48 is applied as a power source for supplying +5V voltage. In the first embodiment, the air-conditioning ECU 10 may be constructed by entire electrical components (air-conditioning control circuit components, drive motor components and the like) mounted on the electrical circuit board 9.

Analogue signals from various switches provided on an air-conditioner operating panel 51 installed in an instrument panel 50 provided on a front surface inside the passenger compartment of the vehicle and from various sensors are converted into digital signals by the A/D converting circuit, and the converted signals input into the input terminal of the microcomputer 90. In the first embodiment, the various sensors includes an interior air temperature sensor (an interior air temperature detecting means) 52, an exterior air temperature sensor (an exterior air temperature detecting means) ;53, a solar radiation sensor (a solar radiation detecting means) 54, a post-evaporator temperature sensor (a cooled degree detecting means) 55, a cooling water temperature sensor (a cooling-water temperature detecting means) 56, a refrigerant pressure sensor (a refrigerant pressure detecting means) 57, an engine speed sensor (an engine speed detecting means) 58 and a vehicle speed sensor (a vehicle speed detecting means) 59.

Figure 13:
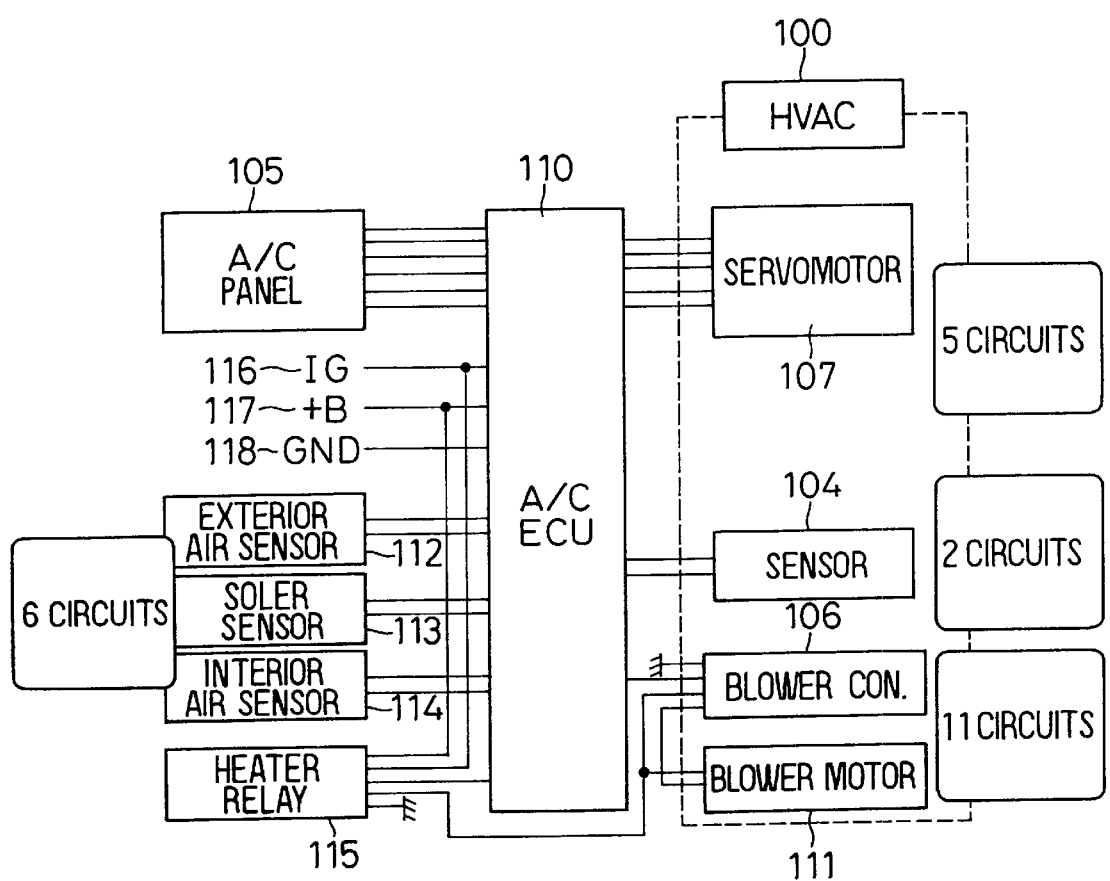
FIG. 13 is a block diagram illustrating electrical members of a vehicle air-conditioning system according to a comparison example of the sixth embodiment.

Among the various sensors, the post-evaporator temperature sensor 55 is a temperature sensor for detecting temperature on a side surface of the evaporator 15, and an end portion of a lead wire 62 is mechanically mounted on the electrical circuit board 9 as shown in FIG. 13. Further, the post-evaporator temperature sensor 55 is disposed in such a manner that a temperature sensitive portion (sender portion) 61 arranged in an interior portion of the evaporator case 7 via the lead wire 62 electrically connected to the microcomputer 90 contacts the side plate (corresponding to a side surface of the cooling heat exchanger of the present invention) of the evaporator 15.

The refrigerant pressure sensor 57 detects high pressure or low pressure of the refrigerating cycle. In the first embodiment, thermistors are utilized for the interior air temperature sensor 52, the exterior air temperature sensor 53, the post-evaporator temperature sensor 55, and the cooling water temperature sensor 56. In the first embodiment, the post-evaporator temperature sensor 55 may be installed so as to detect temperature of air directly after passing through the evaporator 15.

Figure 1A:
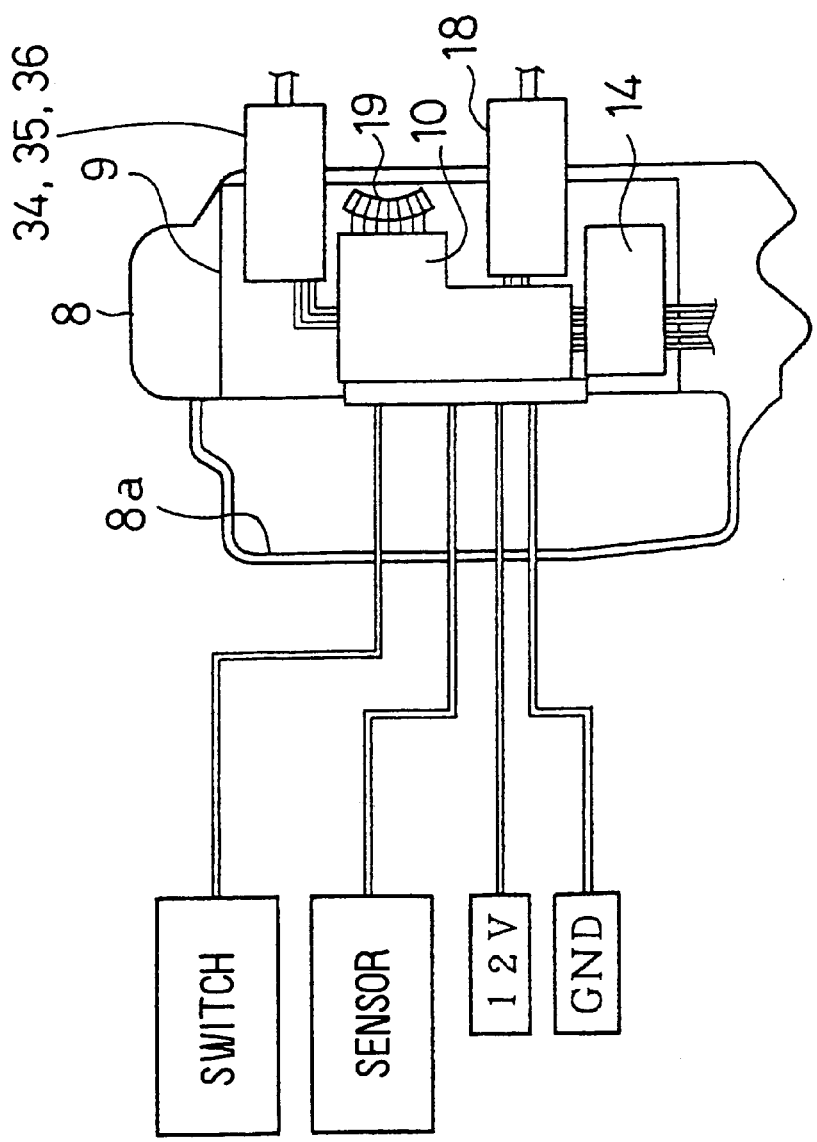
FIG. 1A is a schematic plan view illustrating an evaporator case cover in which an electrical circuit board is assembled according to a first preferred embodiment of the present invention.
Figure 2:
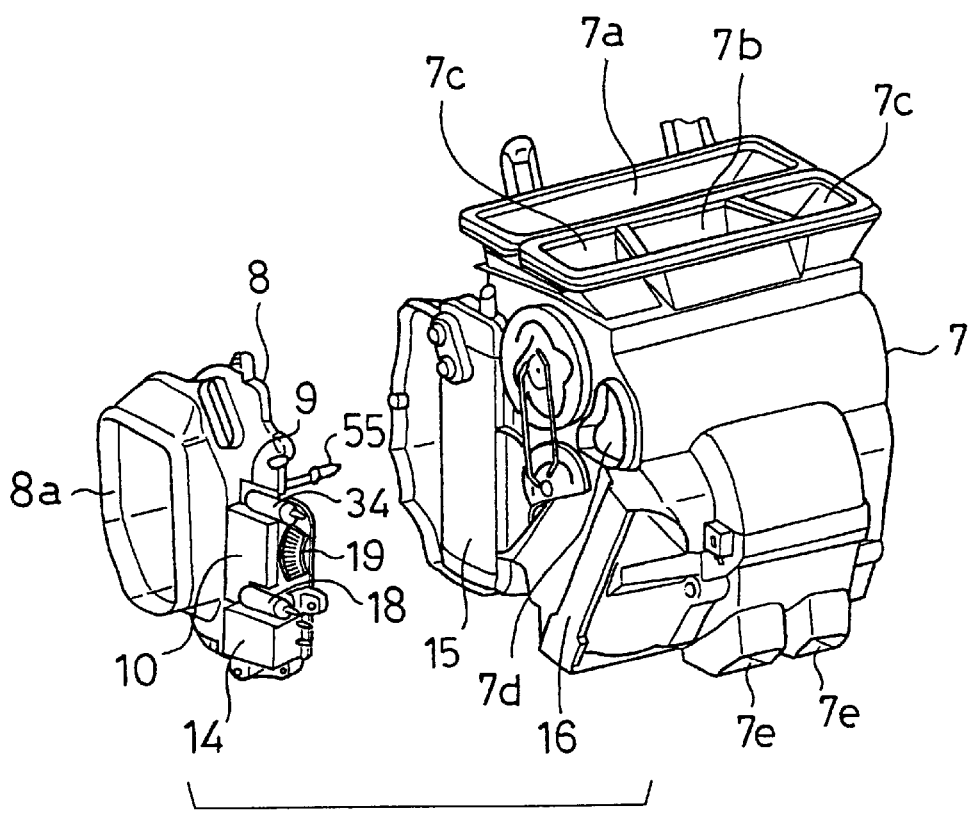
FIG. 2 is an exploded view illustrating a semi-center type air-conditioning unit according to the first embodiment.

An evaporator case cover 8 made of a polypropylene resin (PP), for example, is disposed in a freely attachable and detachable manner on a working window provided on the side surface of the evaporator case 7 of the first embodiment. That is, the evaporator case cover 8 is detachably disposed on the side surface of the evaporator 15 by means of fastening or the like. As shown in FIGS. 1A, 1B and 2, the evaporator case cover 8 is integrally mounted with the one electrical circuit board 9 on which the microcomputer 90, the blower controller 14, the servomotors 18 and 34–36, the potentiometer 19, the electrical source circuit 49 and the post-evaporator temperature sensor 55 are integrated.

Further, the evaporator case cover 8 is provided with a connection port 8a for communicating with a downstream air side of the centrifugal blower, and a hole portion (not illustrated) for exposing the blower controller 14 and the temperature sensitive portion 61 of the post-evaporator temperature sensor 55 to inside the air passage 2. The connection port 8a communicates with a discharge port of the scroll case 11. In the first embodiment, the blower controller 14 is a heat-generating member, for example, MOSFET or the like, and is disposed on the side plate of the evaporator 15 to contact the side plate via an insulating sheet (not illustrated) as an insulating member excellent in an electrical insulating property.

The electrical circuit board 9 is an electrical wiring board (e.g., an air-conditioning control circuit board, an ECU board, a PC board, a printing circuit board and it is called one board), and is made of, for example, epoxy resin containing glass. The electrical circuit board 9 is integrally formed with an exterior wall surface of the evaporator case cover 8. More definitely, the board 9 is fixed by adhesion or by fastening so as to close the hole portion formed on the evaporator case cover 8. In the first embodiment, the electrical circuit board 9 may contain a bus bar (metal connecting piece) in a shape of the printing circuit board, and may be connected to a junction block (J/B) integrated with components such as a relay, a fuse, and a circuit breaker.

Next, features of the vehicle air-conditioning system of the first embodiment will be now described with reference to FIGS. 1–5.

In the first embodiment, on the electrical circuit board 9 integrally mounted with the exterior wall surface of the evaporator case cover 8 located at a side of the evaporator 15, the microcomputer 90 and the electrical members (i.e., first electrical member) such as the blower controller 14, the servomotors 18 and 34–36, the potentiometer 19, the electrical source circuit 49, and the post-evaporator temperature sensor 55 are directly and collectively mounted.

Therefore, a connector, a wire harness, and a lead wire which are required in the prior art for wire connection of the electrical members with one another, can be eliminated. Accordingly, the number of electrical wires of the wire harness or the lead wire can be remarkably reduced for wire connection of the blower controller 14, the servomotors 18 and 34–36, the potentiometer 19, the electrical source circuit 49, and the post-evaporator temperature sensor 55 to the microcomputer 90.

Further, in the first embodiment, the blower controller 14 constructed by, for example, MOSFET or the like is attached onto the side surface of the evaporator 15. Namely, a heat-generating portion of the blower controller 14 mounted on the electrical circuit board 9 is disposed to protrude from the hole portion of the evaporator case cover 8 onto an evaporator side so as the heat-generating portion to be brought into contact with the side plate of the evaporator 15 via the insulating sheet. Therefore, the heat-generating portion of the blower controller 14 is cooled.

Thus, a cooling fan for the heat-generating members can be eliminated. Therefore, it is compared with a case where the heat-generating members are cooled by means of a cooling fan largely protruding inside the air passage, a draft resistance inside the air passage can be reduced due to elimination of the cooling fan. Further, the elimination of the cooling fan can contribute to lowering of noise in operation of the vehicle air-conditioning system. Because the heat-generating portion of the blower controller 14 can be efficiently cooled, performance of the blower controller 14 is possible to be improved.

Further, the temperature sensitive portion (sender portion) of the post-evaporator temperature sensor 55 is disposed to contact the side surface of the evaporator 15 and is mounted thereon to detect the temperature of the side surface of the evaporator 15. Therefore, the post-evaporator temperature sensor 55 is never brought into contact with the evaporator case cover 8. As a result, the temperature of the side surface of the evaporator 15 can accurately be detected by the post-evaporator temperature sensor 55 without being influenced by peripheral temperature of the evaporator case cover 8 and the evaporator case 7.

Incidentally, in the first embodiment, connection between the output terminal of the microcomputer 90 and the compressor drive circuit 25, between the output terminal of the microcomputer 90 and the servomotor 60 further, the connection of the input terminal of the microcomputer 90 to various switches of the air-conditioning operating panel 51, to the interior air temperature sensor 52, the exterior air temperature sensor 53, to the solar radiation sensor 54, to the cooling water temperature sensor 56, to the refrigerant pressure sensor 57, to the engine speed sensor 58, and to the vehicle speed sensor 59, that is, the connection of the other electrical members not collectively mounted on the electrical circuit board 9 to the input terminal of the microcomputer 90, are performed by the use of flat wires and not by the use of connectors.

Further, the ECU cover for covering the electrical members concentrated onto the electrical circuit board 9 of the evaporator case cover 8 is assembled, and simultaneously, wiring connection of the other electrical members is performed. Therefore, with regard to the connection of the other electrical members not collectively mounted onto the electrical circuit board 9, use of the connectors can be eliminated by utilizing the flat wires (FPC, FFC) or the bus bars. In addition, by applying multiplex communication to communication with operation panels and ECU for controlling the other body which are normally arranged in the vicinity or in interior portions of the instrument panel 50, the number of electrical wires of the wire harness and lead wire can be drastically decreased.

As described above, in the vehicle air-conditioning system of the first embodiment, since the number of the connectors and the number of the electrical wires of the wire harness and the lead wire can remarkably be reduced by applying such a manner that a plurality of electrical members (an air-conditioning control circuit member, a drive motor member and the like) are collectively disposed on the electrical circuit board 9 integrally formed with the evaporator case cover 8 of the evaporator case 7 of the air-conditioning duct 3, thus space saving can be realized. Accordingly, assembling steps of the electrical members for controlling the vehicle air-conditioning system are possible to be markedly reduced, and curtailment in manufacturing cost can be realized.

Further, by not only the electrical members to be used for controlling the vehicle air conditioning system but also second electrical members such as ECU, the junction block (J/B), the wire harness, and the lead wire for controlling the other body of the periphery arranged in the interior portion or in the vicinity of the instrument panel 50 are collectively mounted on the electrical circuit board 9, heat-generating portions of the other electrical members such as an integration relay (an integrated relay having a plurality of functions directly, without via the electrical wires, mounted on the junction block (J/B) concentrating an electrical source system and a signal system) and the IPS can be simultaneously cooled.

Further, since the electrical source circuit 49 for supplying an electrical source to the microcomputer 90 can be commonly formed with ECU (i.e., second electrical members) for controlling the other body, further reduction in manufacturing cost and in the number of the electrical wires (e.g., reduction the number of connectors, reduction in the number of electrical wires of the wire harness and the lead wire) can be realized. In the above-described first embodiment, the electrical members such as the blower controller 14, the servomotor 18 and the potentiometer 19 electrically operate when electrical power is applied thereto, and perform signal input/output operation between control circuit members (e.g., microcomputer 90)

Figure 6A:
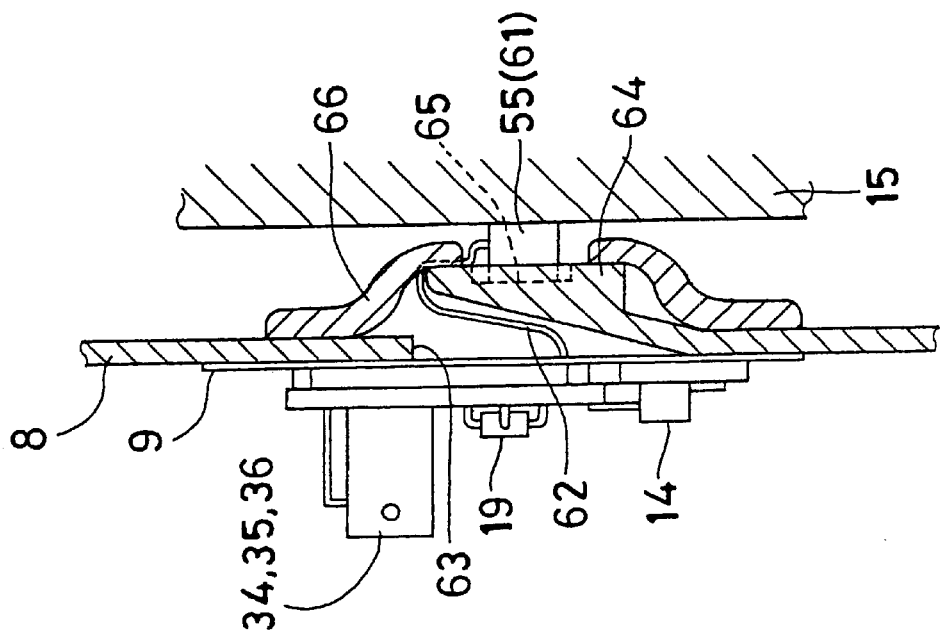
FIG. 6A is a plan view illustrating an evaporator case cover in which an electrical circuit board is assembled according to a second preferred embodiment of the present invention.
Figure 6B:
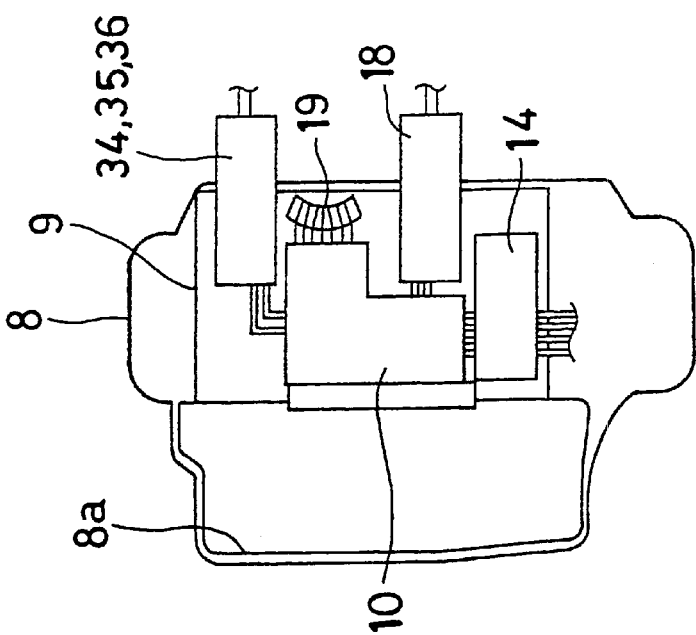
FIG. 6B is a schematic sectional view illustrating a contact structure of a temperature sensitive portion of a post-evaporator temperature sensor on a side surface of an evaporator according to the second embodiment.

A second preferred embodiment of the present invention will be now described with reference to FIGS. 6A and 6B. FIG. 6A is a plan view illustrating the evaporator case cover 8 to which the electrical circuit board 9 is assembled, and FIG. 6B is a view illustrating a contact structure of the temperature sensitive portion 61 of the post-evaporator temperature sensor 55 on the side surface of the evaporator 15.

In the present embodiment, similar to the above-described first embodiment, the microcomputer 90, and the electrical members such as the blower controller (the heat-electrical members such as the blower controller (the heat-generating members of MOSFET and the like) 14, the servomotors 18 and 34–36, the potentiometer 19 and the electrical source circuit 49 are collectively arranged (collectively mounted) on a surface of the electrical circuit board 9 integrally mounted with the working window provided on the side surface of the evaporator case 7, that is, with the exterior wall surface of the evaporator case cover 8 for covering the side surface of the evaporator case 7.

The post-evaporator temperature sensor 55 is a temperature sensor (thermistor) for detecting temperature of the side surface of the evaporator 15, by contacting the temperature sensitive portion 61 onto the side surface of the evaporator 15. The temperature sensitive portion 61 is a temperature detecting portion of the sensor 55. A lead wire 62 penetrates through the hole portion (not illustrated) formed in the electrical circuit board 9 mounted on the exterior wall surface of the evaporator case cover 8 and an opening portion 63 formed in the evaporator case cover 8, so that the post-evaporator temperature sensor 55 is electrically connected to an A/D conversion circuit of the microcomputer 90 disposed on the surface of the electrical circuit board 9.

Further, the evaporator case cover 8 is provided with a sensor pressurizing portion (a hinge portion) 64 integrally molded therewith by a resin material at a position corresponding to the opening portion 63. The sensor pressurizing portion 64 has a recessed shape portion 65 for holding the temperature sensitive portion 61 of the post-evaporator temperature sensor 55, on a tip end surface thereof. The sensor pressurizing portion 64 is provided to be elastically deformable so that the temperature sensitive portion 61 of the post-evaporator temperature sensor 55 is biased toward a side surface of the evaporator 15. Therefore, contact pressure of the temperature sensitive portion 61 of the post-evaporator temperature sensor 55 to be applied to the side surface of the evaporator 15 can be maintained.

Furthermore, an approximate annular packing 66 which is ranged from an outer peripheral portion of an interior side surface of the sensor pressurizing portion 64 to an interior wall surface around the opening portion 63 of the evaporator case cover 8, is provided between an interior side surface of the evaporator case cover 8 and the side surface of the evaporator 15. The packing 66 is fixed at outer peripheral end portion thereof to the inner wall surface of the evaporator case cover 8 by the use of bonding means such as an adhesive, and it is used as a sealant for preventing water leakage or air leakage to an exterior of the evaporator case cover 8.

According to the second embodiment of the present invention, the electrical circuit board 9 having collectively arranged the electrical members, the post-evaporator temperature sensor 55 and the packing 66 are assembled to the evaporation case cover 8. In this state, the evaporator case cover 8 is assembled to the air-conditioning unit (i.e., the side surface of the evaporator case 7). By the way, there is a case where size of a clearance (space) between the side surface of the evaporator 15 and the interior wall surface of the evaporator case cover 8 is to greatly fluctuate by size tolerances of constituting members of the air-conditioning unit and by an assembling tolerance thereof. Even in such a case, the clearance (space) described above can be absorbed by means of the sensor pressurizing portion 64 of the evaporator case cover 8, and the contact pressure of the temperature sensitive portion 61 of the post-evaporator temperature sensor 55 onto the side surface of the evaporator 15 can be sufficiently obtained.

According to the structure of the second embodiment, a contact portion of the temperature sensitive portion 61 of the post evaporator temperature sensor 55 is set to the side plate on the side surface of the evaporator 15 to contact therewith, and air temperature directly after passing through the evaporator 15 is estimated from temperature of the side plate in the air-conditioning ECU 10. Since mounting of the post-evaporator temperature sensor 55 is completed by just assembling the evaporator case cover 8 to the air-conditioning unit, fixing work of the post-evaporator temperature sensor 55 to a rear face of the evaporator 15 with the use of a mounting bracket such as a clamp is not required, and assembling workability can be significantly improved.

Further, in the second embodiment, while the evaporator case cover 8 is assembled to the air-conditioning unit (the side surface of the evaporator case 7), the mounting of the packing 66 for blocking the opening portion 63 of the evaporator case cover 8 liquid-tightly and air-tightly is complete, so that the water leakage and the air leakage to the exterior portion of the evaporator case cover 8 are possible to be prevented. Thereby, in the second embodiment, not only similar effect as the first embodiment can be achieved, but also it is possible to further improve the assembling workability.

Figure 7:
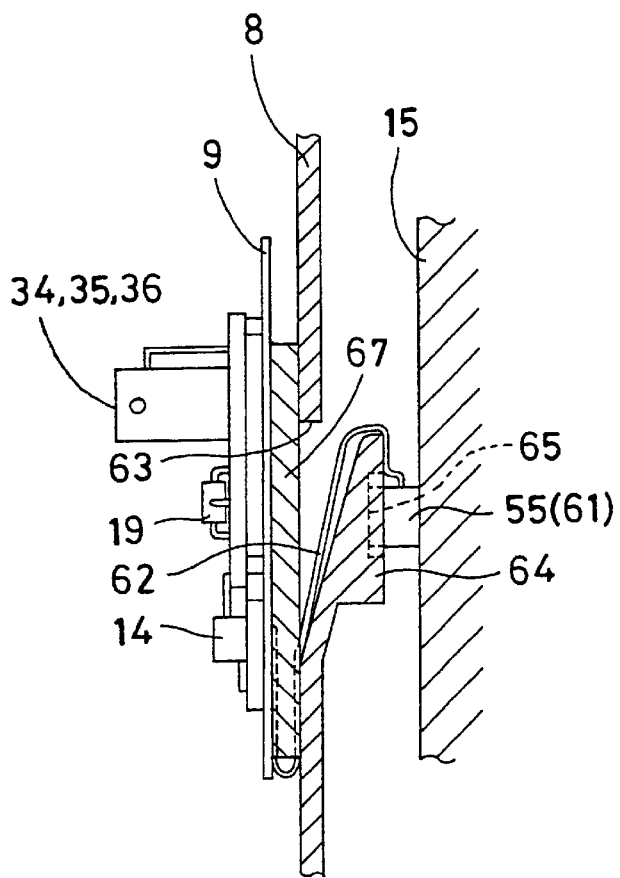
FIG. 7 is a schematic sectional view illustrating a contact structure of a temperature sensitive portion of a post-evaporator temperature sensor on a side surface of an evaporator according to a third preferred embodiment of the present invention.

A third preferred embodiment of the present invention will be now described with reference to FIG. 7. FIG. 7 is a view illustrating a contact structure of the temperature sensitive portion 61 of the post-evaporator temperature sensor 55 onto the side surface of the evaporator 15.

In the third embodiment, the contact pressure of the temperature sensitive portion 61 of the post-evaporator temperature sensor 55 onto the side surface of the evaporator 15 is secured by the sensor pressurizing portion (hinge portion) 64 integrally molded with an inner peripheral side of the opening portion 63 of the evaporator case cover 8. A packing 67 as a sealant for closing the opening portion 63 of the evaporator case cover 8 is disposed between the exterior wall sure of the evaporator case cover 8 and a rear surface of the electrical circuit board 9 to thereby further improve a waterproofing property of the evaporator case cover 8. In addition, the packing 67 is bonded with the use of bonding means such as adhesive onto the rear surface of the electrical circuit board 9, and the electrical circuit board 9 is attached to the exterior wall surface of the evaporator case cover 8 with the use of a fastener, so that the packing 67 is mounted between the exterior surface of the evaporator case cover 8 and the rear surface of the electrical circuit board 9.

Figure 8:
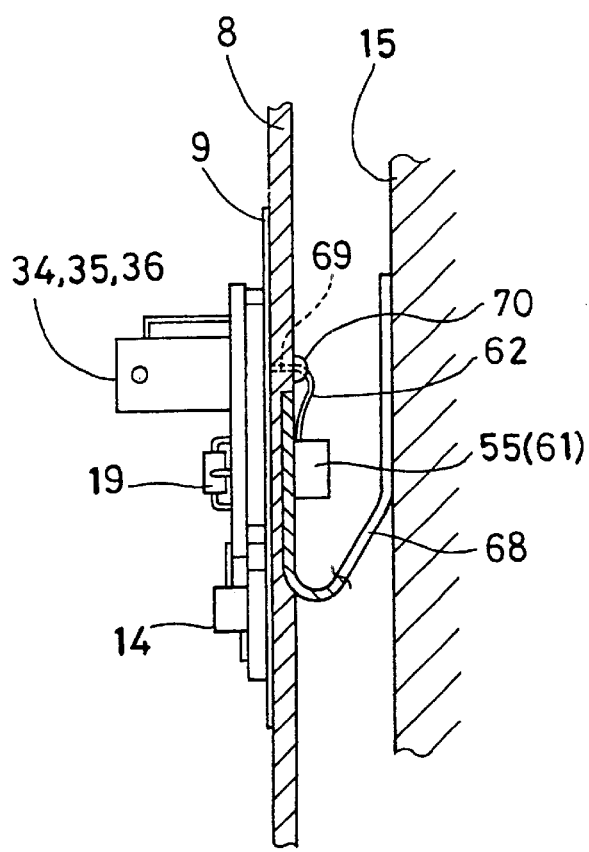
FIG. 8 is a schematic sectional view illustrating a contact structure of a temperature sensitive portion of a post-evaporator temperature sensor according to a fourth preferred embodiment of the present invention.

A fourth preferred embodiment of the present invention will be now described with reference to FIG. 8. FIG. 8 is a view illustrating a contact structure of the temperature sensitive portion 61 of the post-evaporator temperature sensor 55 according to the fourth embodiment.

In the fourth embodiment, a plate spring 68 molded out by a metallic material is disposed at a side of the interior wall surface of the evaporator case cover 8 made of a resin material. The plate spring 68 contacts the side surface of the evaporator 15 by assembling the evaporator case cover 8 to the air-conditioning unit (on the side surface of the evaporator case 7). Further, the post-evaporator temperature sensor 55 is fixed to an interior side surface of the plate spring 68 with the use of the bonding means such as adhesive. Therefore, the post-evaporator temperature sensor 55 detects temperature of the plate spring 68 which contacts the side surface of the evaporator case 7. In addition, a penetrating portion 69 of the evaporator case cover 8, through which the lead wire 62 of the post-evaporator temperature sensor 55 penetrate, is sealed by a rubber base sealant 70 such as butyl rubber in order to provide a waterproofing structure on the evaporator case cover 8.

Figure 9:
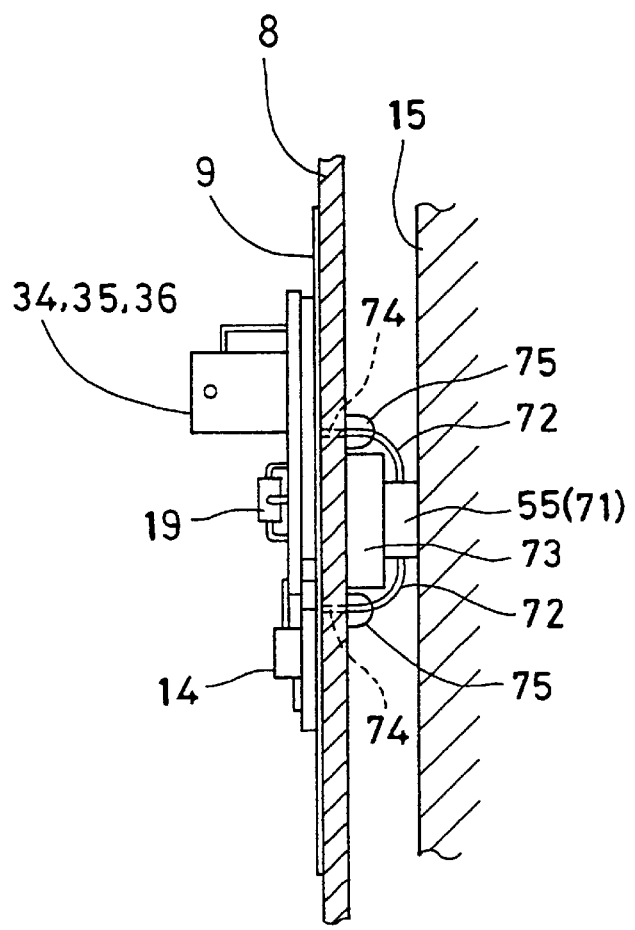
FIG. 9 is a schematic sectional view illustrating a contact structure of a temperature sensitive portion of a post-evaporator temperature sensor on a side surface of an evaporator according to a fifth preferred embodiment of the present invention.

A fifth preferred embodiment of the present invention will be now described with reference to FIG. 9. FIG. 9 is a view illustrating a contact structure of a temperature sensitive portion 71 of the post-evaporator temperature sensor 55 on the side surface of the evaporator 15.

The temperature sensitive portion 71 of the post-evaporator temperature sensor 55 of the fifth embodiment is electrically connected to the rear surface of the electrical circuit board 9 across the evaporator case cover 8 by lead wires 72. Further, a rubber base packing 73 installed between the interior wall surface of the evaporator case cover 8 and the temperature sensitive portion 71 of the post-evaporator temperature sensor 55 is for securing the contact pressure of the temperature sensitive portion 71 of the post-evaporator temperature sensor 55 onto the side surface of the evaporator 15, when the evaporator case cover 8 is assembled to the air-conditioning unit (the side surface of the evaporator case 7). In addition, a penetration portion 74 of the evaporator case cover 8, through which lead wires 72 of the post-evaporator temperature sensor 55 penetrate, is sealed by a rubber base sealant 70 made of butyl rubber, for example, in order to prevent the air leakage from the air-conditioning unit (evaporator case cover 8).

Figure 11:
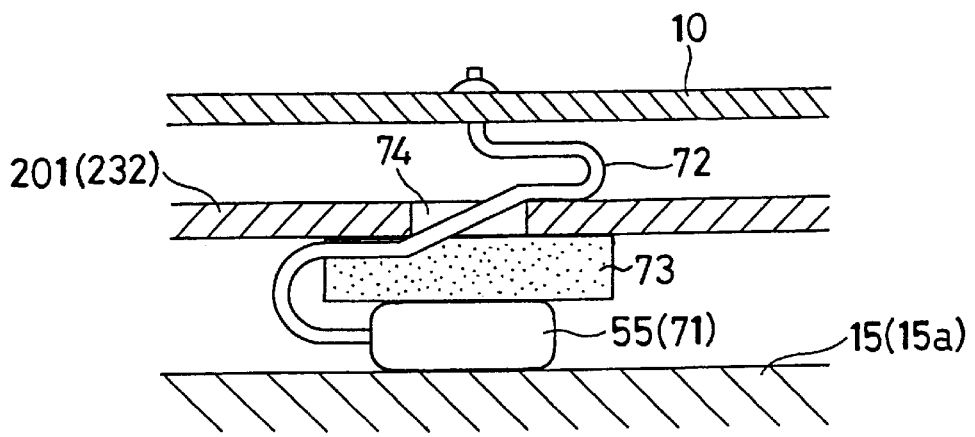
FIG. 11 is a schematic sectional view illustrating a contact structure of a temperature sensitive portion of a post-evaporator temperature sensor on a side surface of an evaporator according to the sixth embodiment.
Figure 10:
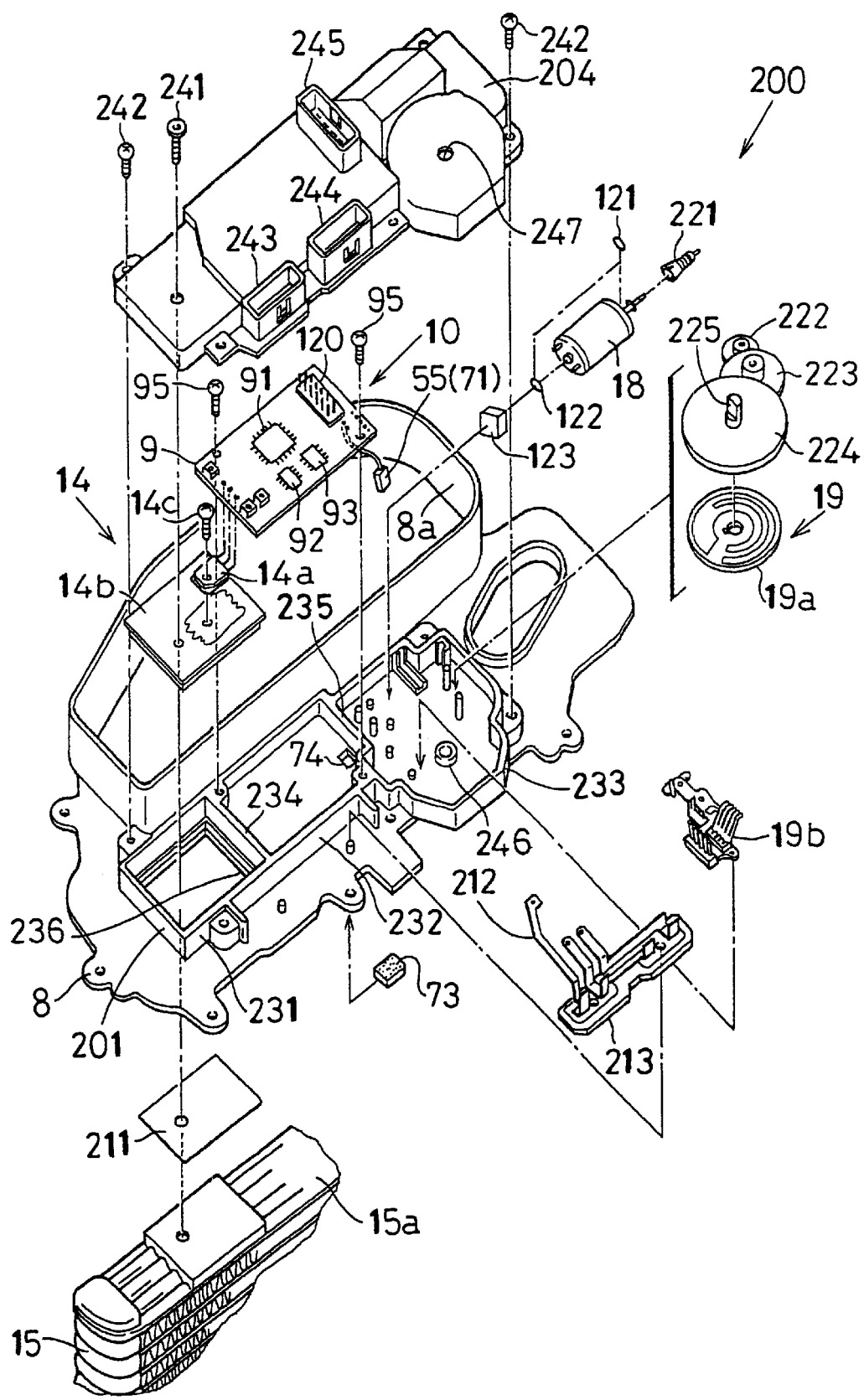
FIG. 10 is an exploded view illustrating a control module of electrical members in an evaporator case cover according to a sixth preferred embodiment of the present invention.
Figure 12:
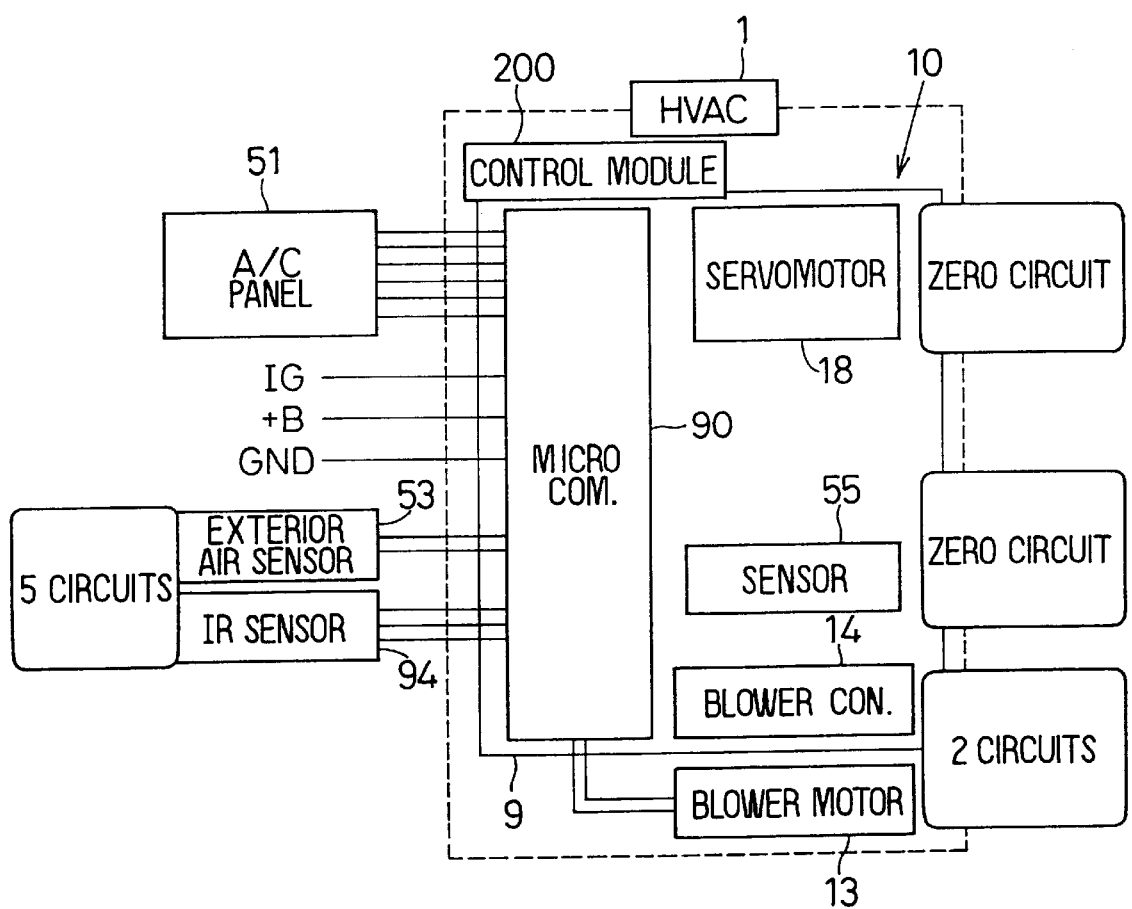
FIG. 12 is a block diagram illustrating a control module of plural electrical members integrally with one another according to the sixth embodiment.

A sixth preferred embodiment of the present invention will be now described with reference to FIGS. 10–12. FIG. 10 is a view illustrating a control module in which a plurality of the electrical members are integrally formed with the evaporator case cover 8. In the sixth embodiment, the evaporator case cover 8 made of a first resin, for example polypropylene resin (PP) and the like is detachably disposed on the side surface of the evaporator 15, that is, on a side plate 15a of the evaporator 15. Further, an ECU housing 201 accommodating the control module 200 is integrally formed with the exterior wall surface of the evaporator case cover 8. In the control module 200, the blower controller 14 and the microcomputer 90 collectively arranged on the electrical circuit board 9, the post-evaporator temperature sensor 55, the servomotor 18 of the A/M door 17, the potentiometer 19 and the like are collectively integrated.

Here, the blower controller 14 has a heat-generating member 14a, for example, MOSFET or the like, and a heat buffer 14b onto which the heat-generating members 14a is bonded. The blower controller 14 is attached to the side plate 15a of the evaporator 15 by using the fastener such as a screw 14c so as to contact the side plate 15a via an insulating sheet (corresponding to the insulating member of the present invention) 211 excellent in an electrical insulating property. Three terminals of the heat-generating members 14a are arranged to project to a surface side from the rear surface of the electrical circuit board 9 by penetrating through the three hole portions formed in the electrical circuit board 9. Further, an insulating board 213 is provided integrally with a plurality of the bus bars (metal connecting pieces) 212 for electrically connecting the heat-generating members 14a to two circuits of the blower motor 13 and to two circuits of a battery (+B) or a grounding (GND).

The air-conditioning ECU 10 of the sixth embodiment is disposed inside the ECU housing 201 and is packaged by mounting the ECU cover 204 in a state that the microcomputer 90, the heat-generating members 14a of the blower controller 14, an exterior connecting terminal portion 120 and the post-evaporator temperature sensor (an air-conditioning control sensor) 55 are collectively arranged on the electrical circuit board 9. The microcomputer 90 is constructed by including functions such as at least CPU, the memory (ROM and RAM), the input/output circuits, and A/D conversion circuit and the timer circuit, and is formed by a plurality of pieces of LSI 91–93 mounted on a surface of the electrical circuit board 9.

Further, the exterior connecting terminal portion 120 is used as a connector. The ignition switch (IG) 46, the air-conditioning operating panel 51, the exterior air temperature sensor (a sensor for an air-conditioning control) 53, an infrared sensor (IR) 94 and the like are electrically and mechanically connected to the terminal portion 120 via the wire harness (not illustrated). In the sixth embodiment, the infrared sensor 94 is an air-conditioning control sensor concurrently using as the interior temperature sensor and the solar radiation sensor. Further, numeral 95 designates a screw for assembling the electrical circuit board 9 to the ECU housing 201.

The post-evaporator temperature sensor 55 of the sixth embodiment is the sensor corresponding to a side surface temperature sensor of the evaporator 15, and is constructed by, for example, the temperature sensitive portion 71 of the thermisor, the lead wires 72 and the like. As shown in FIGS. 10 and 11, the temperature sensitive portion 71 is electrically connected to the rear surface of the electrical circuit board 9 across the evaporator case cover 8 by the lead wires 72. Further, the rubber base packing 73 is mounted between the interior wall surface of the evaporator case cover 8 and the temperature sensitive portion 71, so that the contact pressure of the temperature sensitive portion 71 of the post-evaporator temperature sensor 55 onto the side surface of the evaporator 15 can be obtained when the evaporator case cover 8 is assembled to the side surface of the evaporator case 7. The penetrating portion 74 formed in a bottom surface of the ECU housing 201 is the hole portion through which the lead wire 72 of the post-evaporator temperature sensor 55 penetrates. As described in the fifth embodiment, in order to prevent the air leakage from the ECU housing 201 forming a part of the evaporator case 7 may be sealed by the rubber base sealant.

The servomotor 18 of the A/M door 17 corresponds to the second actuator of the present invention, and a worm gear 221 is fixed to an output shaft of the servomotor 18. In addition, the output shaft of the servomotor 18 protrudes from both end surface of a motor case, and the protrusion portion is mounted on an outer periphery thereof with O-rings 121 and 122. Further, the servomotor 18 is disposed inside the ECU housing 201 via a cushion 123 for restraining vibration. In the sixth embodiment, the servomotors (corresponding to the first actuators of the present invention) 34–36 of the mode switching doors 31–33 may be added in addition to the servomotor 18 of the A/M door 17. The servomotors 34–36 of the mode switching doors 31–33 may be constructed of one piece of servomotor, and the one piece of servomotor may be connected to respective mode switching doors 31–33 via link mechanisms.

As shown in FIG. 10, the worm gear 221 of the servomotor 18 transmits rotary torque via the reduction gears 222 and 223 to an output gear 224 for driving a shaft (not illustrated) of the A/M door 17. The output gear 224 is provided with a rotary shaft 225 using as a rotary center. The potentiometer 19 includes a contact plate 19a integrally turning with the rotary shaft 225, and an electrical contact portion (a fixed contact) 19b which is brought into contact with the contact plate (a movable contact) 19a and outputs an opening degree signal of the A/M door 17. The electrical contact portion 19b is fixed to an exterior wall surface of the ECU housing 201. In the sixth embodiment, a drive servo (a drive portion) is constructed by the servomotor 18, the worm gear 221, the reduction gears 222 and 223, and the output gear 224.

The ECU housing 201 corresponds to a housing of the present invention, is a rib portion integrally molded out by resin in a shape of projection with the exterior wall surface of the evaporator case cover 8 made of the first resin. The ECU housing 201 includes a first containing portion 231 containing the heat buffer 14b onto which the heat-generating members 14a such as MOSFET of the blower controller 14 is bonded, a second containing portion (an ECU containing portion, corresponding to a board containing portion of the present invention) 232 for containing the electrical circuit board (air-conditioning ECU) 10, and a third containing portion (a servomotor containing portion) 233 for containing the servomotor 18 of the A/M door 17 and the potentiometer 19. These containing portions 231, 232, 233 are sealed liquid-tightly by the ECU cover 204.

A projection partitioning portion 234 is provided between the first containing portion 231 and the second containing portion 232 and a projection partitioning portion 235 is provided between the second containing portion 232 and the third containing portion 233. Further, the first containing portion 231 is provided with a hole portion 236 having a shape of a square, for exposing the heat-generating members 14a such as MOSFET of the blower controller 14 inside the evaporator case 7. Furthermore, the penetrating portion (the hole portion) 74, through which the lead wire 72 of the post-evaporator temperature sensor 55 penetrates, is formed in a bottom wall surface of the second containing portion 232.

The ECU cover 204 is integrally molded out by the first resin which is the same material as the ECU housing 201. The ECU cover 204 is fastened and fixed to the heat buffer 14b by means of the fastener such as a screw 241, and is fastened and fixed onto an exterior wall surface on a circumference of the ECU housing 201 of the evaporator case cover 8 by means of the fastener such as a screw 242. The ECU cover 204 is integrally molded to protrude in a sideward direction of the evaporator 15 with two pieces of connector portions 243 and 244. The connector portions 243 and 244 liquid-tightly hold the plural bus bars 212 of the blower controller 14, and are capable of fitting in a recess and projection relationship with a connector portion (not illustrated) on a vehicle side.

Further, a connector portion 245 is integrally molded with the ECU cover 204 to protrude in a sideward direction of the evaporator 15. The connector portion 245 liquid-tightly holds plural exterior connecting terminals (connector pins) standingly provided on the exterior connecting terminal portion 120, and can be engaged with a connector portion (not illustrated) on the vehicle side. In addition, bearing holes 246 and 247, for freely and rotatably supporting the rotary shaft 225 provided to protrude from both end surfaces of the output gear 224 for the servomotor of the A/M door 17, is formed in a bottom wall surface (the exterior wall surface of the evaporator case cover 8) of the third containing portion 233 of the ECU housing 201 and in the ECU cover 204, respectively.

In a vehicle air-conditioning system as a comparison example of the sixth embodiment, as illustrated in FIG. 13, an electrical circuit board (air-conditioning ECU) 110 is arranged to be separated from an air-conditioning unit 100. Therefore, the air-conditioning ECU 110 is connected with wires to a servomotor 107 of an A/M door, to a post-evaporator temperature sensor (the thermistor) 104, and to a blower controller 106 for controlling a blower motor 111 in a current carrying manner. Further, the air-conditioning ECU 110 is connected with wires to various switches installed on an air conditioner operation panel 105, to an exterior air temperature sensor 112, to a solar radiation sensor 113, to an interior air temperature sensor 114, to a heater relay 115, to an IG switch 116, to a battery (+B) 117, and to a grounding (GND) 118, via wire harnesses (33 circuits) wired on a vehicle.

However, in the vehicle air-conditioning system according to the sixth embodiment, the air-conditioning ECU 10 is integrally mounted on the exterior wall surface of the evaporator case cover 8 for covering the working window of the evaporator case 7 forming a part of the air-conditioning duct 3 of the air-conditioning unit 1. Further, as illustrated in FIG. 10 to FIG. 12, the air-conditioning ECU 10 is directly connected with wires to respective air-conditioning control circuit members and drive motor members so as to form the control module 200, so that the wire harness of a vehicle can be reduced not more than 11 circuits. Therefore, the number of wirings is reduced and the vehicle air-conditioning system is manufactured in low cost. In addition, in the sixth embodiment, the heater relay described in the comparison example is eliminated and the infrared (IR) sensor 94 which is concurrently used as the solar radiation sensor and the interior air temperature sensor is provided. Accordingly, further improvement in saving the number of the wires can be obtained. For example, as shown in FIG. 12, the wire harness can be reduced to 7 circuits.

Figure 14:
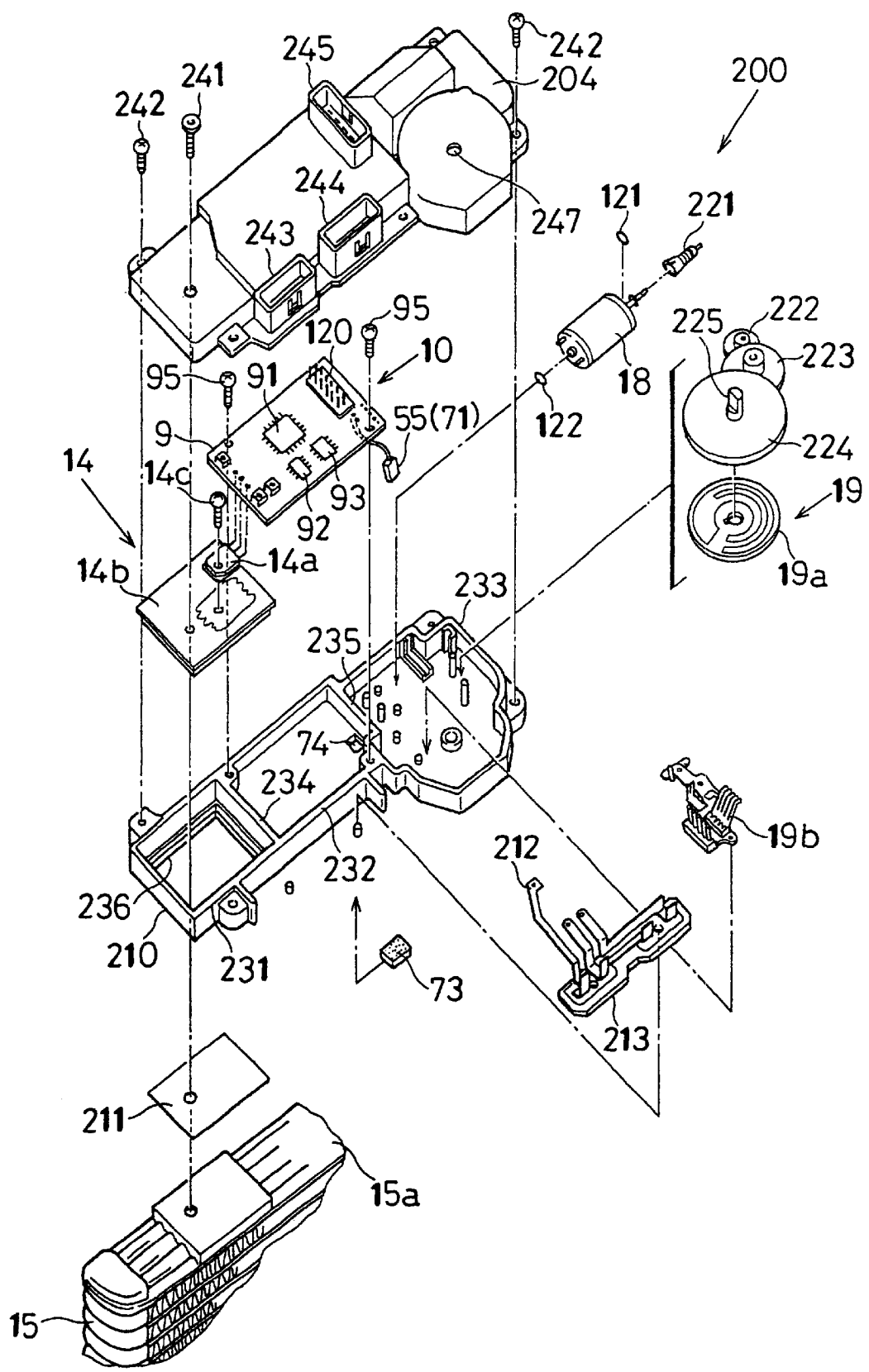
FIG. 14 is an exploded view illustrating a control module of plural electrical members integrally formed with one another according to a seventh preferred embodiment of the present invention.

A seventh preferred embodiment of the present invention will be now described with reference to FIG. 14. FIG. 14 illustrates a control module 200 in which a plurality of electrical members are integrally formed.

When the ECU housing 201 is integrally molded with the evaporator case cover 8 which is a part of the air-conditioning duct 3 as described in the sixth embodiment (refer to FIG. 10 to FIG. 12), there has been such problems as that by temperature and environmental conditions (for example 80° C. to −20° C.) depending on the material quality (generally, polypropylene resin: the first resin such as PP) of the evaporator case cover 8, dispersion in a dimension of the evaporator case cover 8 may be generated and axis of the drive portion (a gear) especially for the servomotor 18 or the like is difficult to be produced. Further, when one electrical member among plural electrical members contained inside the ECU housing 201 is failed, the entire evaporator case cover 8 is removed from the evaporator case 7 and the entire evaporator case 8 is needed to be replaced for a maintenance, thus workability in replacement of the electrical member is deteriorated.

Thus, in the seventh embodiment, plural electrical members area separated from the evaporator case cover 8 which is a part of the air-conditioning duct 3, and an ECU housing 210 using as a base is newly provided. The ECU housing 210 is formed separately relative to the evaporator case cover 8, and respective electrical members are disposed inside the ECU housing 210. In the seventh embodiment, the air-conditioning duct 3 is made of a first resin, and the ECU housing 210 is made of a second resin (for example, PP-G30) containing a glass fiber having a material quality with less thermal contraction than the first resin. Further, the control module 200 disposed inside the ECU housing 210 is integrally mounted with the evaporator case cover 8 which is attached onto the side surface of the evaporator case 7 of the air-conditioning duct 3, so that the dispersion due to the thermal contraction described above and maintenance property are improved. In the seventh embodiment, similarly to the above-described sixth embodiment, the control module 200 is constructed by the air-conditioning ECU 10 collectively arranging the blower controller 14 and the microcomputer 90 on the electrical circuit board 9, the post-evaporator temperature sensor 55, the servomotor 18 of the A/M door 17, the potentiometer 19, the ECU housing 210 and the like.

Figure 15:
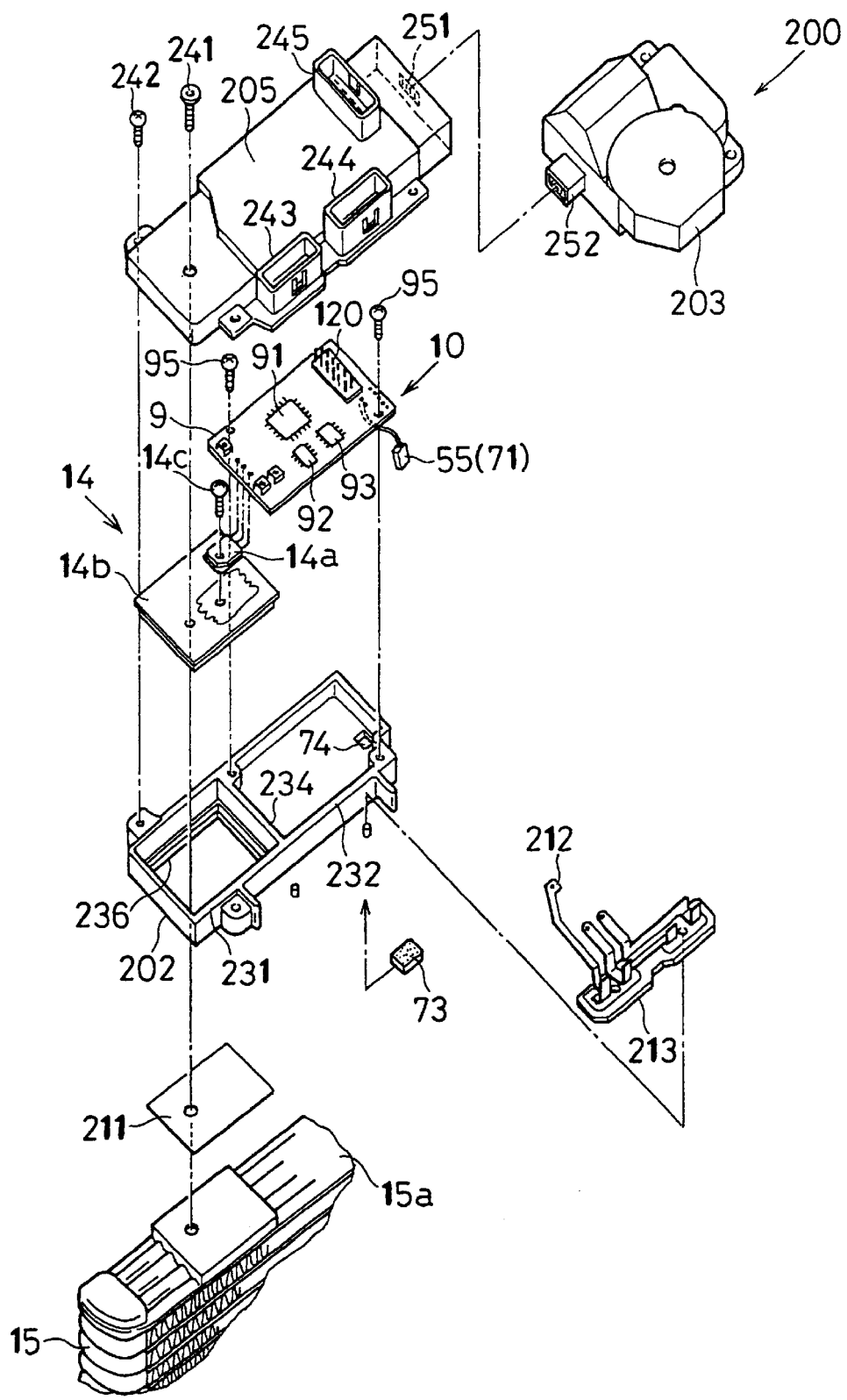
FIG. 15 is an exploded view illustrating a control module of plural electrical members integrally formed with one another according to an eighth preferred embodiment of the present invention.

An eighth preferred embodiment of the present invention will be now described with reference to FIG. 15. FIG. 15 is a view illustrating a control module in which plural electrical members are integrally formed with one another. An ECU housing of the eight embodiment includes a main body case (corresponding to a circuit board case of the present invention) 202 and the ECU cover 205, and at least equal to or more than one piece of drive servo cases (corresponding to an actuator case of the present invention) 203. An air-conditioning ECU 10 formed by collectively arranging a plurality of pieces of LSI large scale integrated circuits) 91–93 constituting of the microcomputer 90, the blower controller 14, and the post-evaporator temperature sensor 14 is disposed inside the main body case 202 and the ECU cover 205.

On the other hand, the drive portion, constructed by the servomotor 18, the worm gear 221, the reduction gears 222 and 223 and the output gear 224, and the potentiometer 19 are disposed inside the drive servo case 203. In the eighth embodiment, the drive servo case 203 may be made of the second resin, and the main body case 202 may be made of the first resin such as PP. In addition, a drive servo case incorporating the servomotor of the mode switching door may be added thereto.

Further, a recess terminal portion (a connector portion) 251 for liquid-tightly holding plural connector pins is integrally molded with a side end of the ECU cover 205. In addition, a projection terminal portion (a connector portion) 252 is integrally molded with a side end of the drive servo case 203. The drive servo case 203 and the ECU cover 205 are cartridge type cases in which both of an electrical connection and a mechanical connection can be performed by inserting the projection terminal portion 252 of the drive servo case 203 into the recess terminal portion 251 of the ECU cover 205.

According to the eighth embodiment of the present invention, the control module 200, a drive motor portion including at least equal to or more than one piece of the servomotor 18 is separately formed with respect to the integrated air-conditioning members in which the air-conditioning ECU 10, the blower controller 14 and the post-evaporator temperature sensor 55 are integrally assembled. Further, in the eighth embodiment of the present invention, assembling property is possible to be improved by directly inserting the projection terminal portion 252 electrically connected to the servomotor 18 or the potentiometer 19 into the recess terminal portion 251 electrically connected to the air-conditioning ECU 10 on a side of the main body case 202.

During a replacement of the servomotor 18, a removal only of a cartridge type drive servo case 203 is enough, and entire electrical members of the control module 200 are not required to be removed. Therefore, maintenance (service) property is possible to be improved. In addition, since only drive motor members versatile not only for the servomotor 18 of the A/M door but also for the servomotors 34–36 of the mode switching door are capable of being standardized, mass production is possible to be realized.

Figure 16:
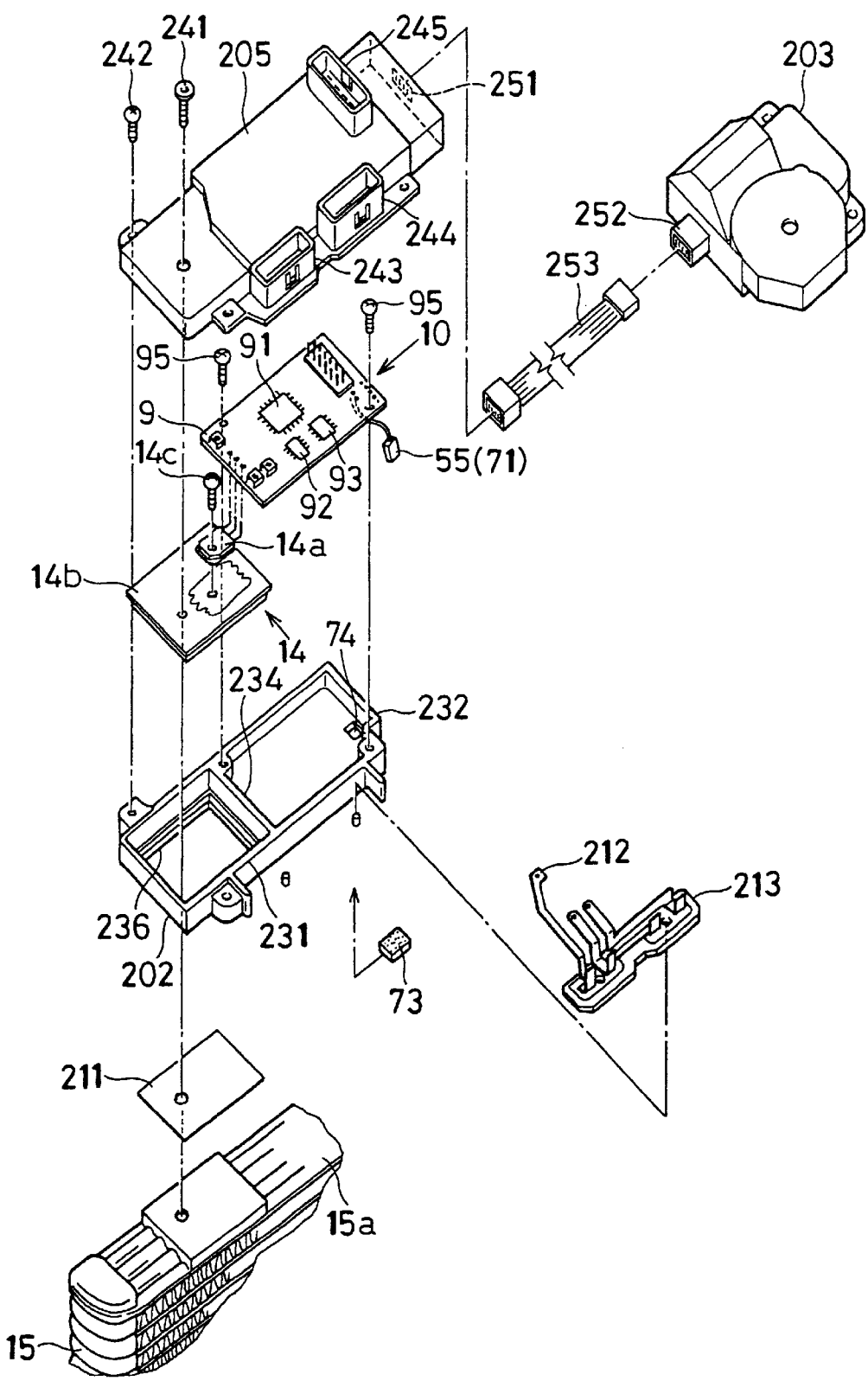
FIG. 16 is an exploded view illustrating a control module of plural electrical members integrally formed with one another according to a ninth preferred embodiment of the present invention.

A ninth preferred embodiment of the present invention will be now described with reference to FIG. 16. FIG. 16 is a view illustrating a control module in which plural electrical members are integrally assembled with one another. In the ninth embodiment, the drive motor portion is separately formed with respect to the integrated air-conditioning control circuit members, and is electrically connected thereto by, utilizing flexible electrical cables (wire harnesses, flexible flat cables and the like) 253. In this case, degree of freedom for a mounting position of the drive servo case 203 incorporating drive motor members can, be improved. The drive servo case 203, for example, can be integrally mounted with the air-conditioning duct 3 in the vicinity of the A/M door. When the drive servo case 203 incorporates the drive motor members such as the servomotor 6 of the an interior/exterior air switching door 5, the drive servo case 203 can be integrally formed with the interior/exterior switching box 4.

Although the present invention has been fully described in connection with the preferred embodiments thereof with reference to the accompanying drawings, it is to be noted that various changes and modifications will become apparent to those skilled in the art.

Figure 17:
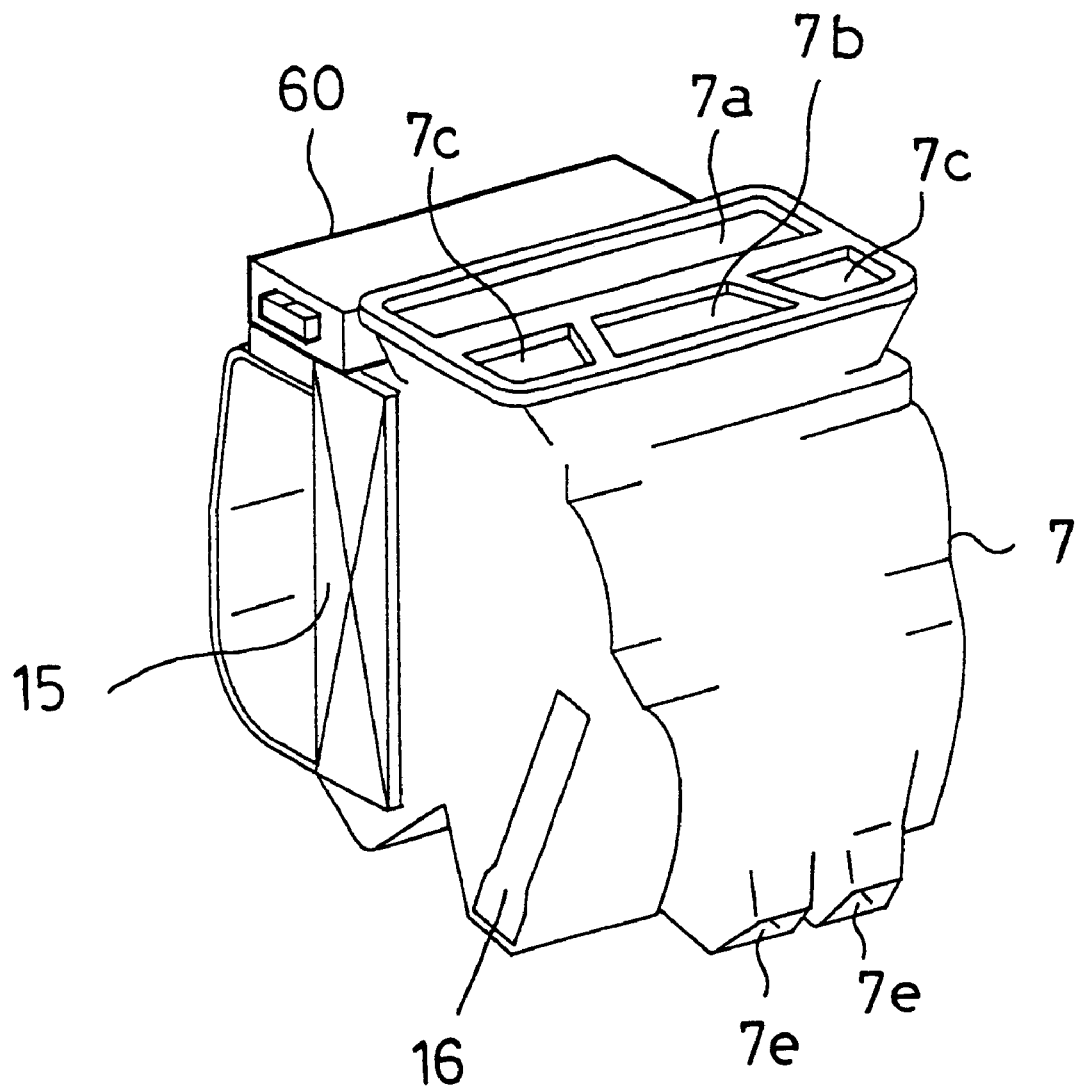
FIG. 17 is a perspective view illustrating a semi-center type air-conditioning unit according to a modification of the present invention.
Figure 18:
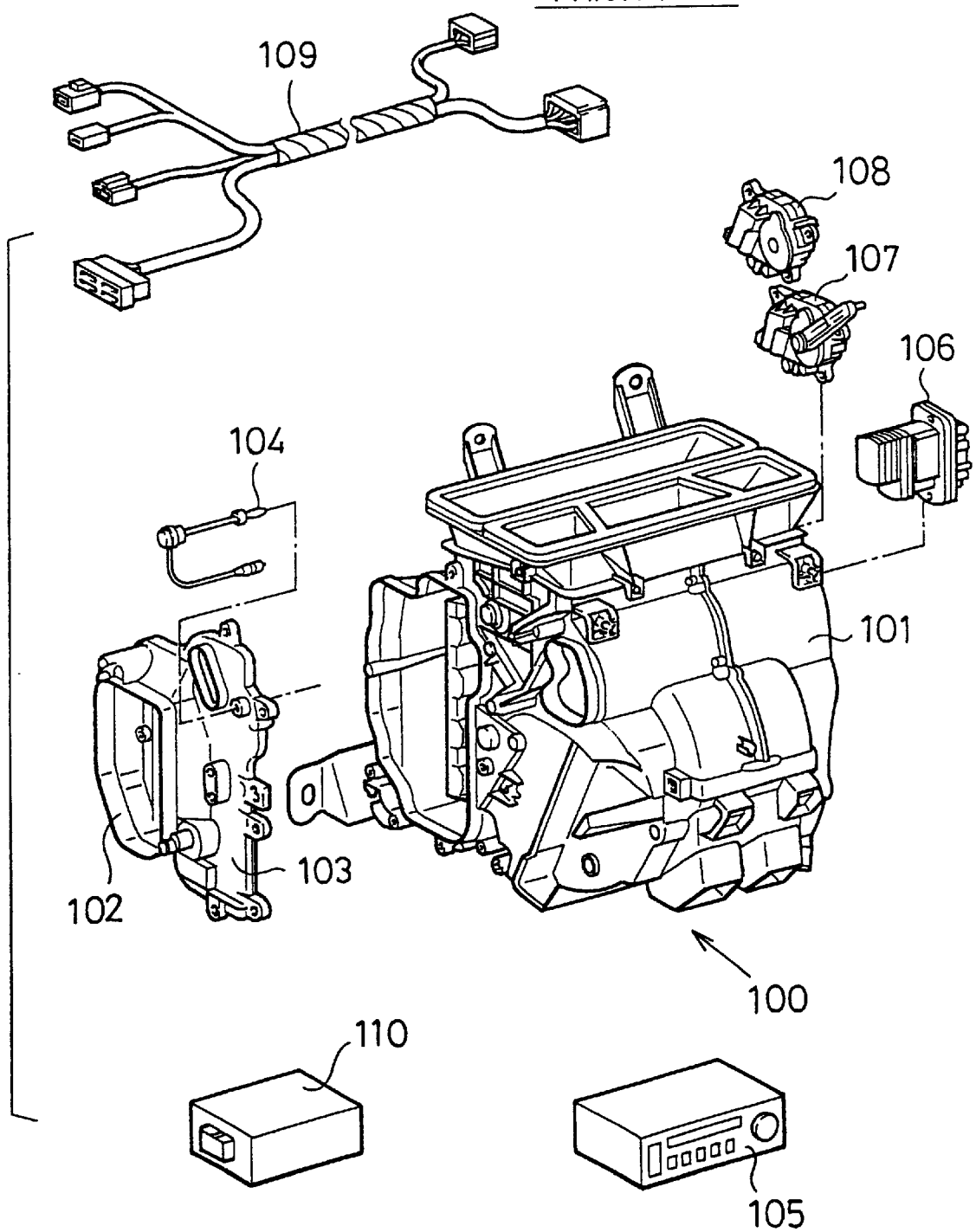
FIG. 18 is a view for explaining a conventional vehicle air-conditioning system.

For example, in the above-described embodiments, at least two pieces or more of the electrical members are concentrated on the electrical circuit board 9 disposed on the evaporator case cover 8 of the evaporator case 7. However, as illustrated in FIG. 17, a concentration portion 60 having therein an electrical circuit board may be installed on an upper part of the evaporator 15. Further, the concentration portion 60 may be disposed in anywhere around a circumference of the evaporator 15. In addition, the electrical circuit board 9 or the air-conditioning ECU 10, in which plural electrical members are collectively arranged, may be mounted on a cover body for attaching or detaching an air filter for capturing foreign matters in air flowing through the air-conditioning duct 3.

In the above-described embodiments, the present invention is applied to the semi-center type air-conditioning unit 1. However, the present invention may be applied, for example, to a traverse type air-conditioning unit or to an air-conditioning unit in which an evaporator is horizontally disposed. Further, in the above-described embodiments, the electric circuit board 9 or the air-conditioning ECU 10, in which the electrical members are concentrically disposed, is integrally formed with the exterior wall surface of the evaporator case cover 8 of the evaporator case (the cleaning unit case) 7 forming a part of the air-conditioning duct 3. However, the electrical circuit board 9 or the air-conditioning ECU 10 may be integrally mounted with an exterior wall surface or on an interior wall surface of the interior switching box 4 forming a part of the air-conditioning duct 3 and a part of an intake unit case forming the scroll case 11.

In the above-described first through fifth embodiments, the microcomputer 90, the blower controller 14, the servomotors 18 and 34–36, the potentiometer 19, the electrical source circuit 49 and the post-evaporator temperature sensor 55 are directly and collectively mounted on the electrical circuit board 9 of the evaporator case cover 8 of the evaporator case 7, however in addition to them, the servomotor 6 as the actuator for driving the interior air/exterior air switching door 5 may be mounted on the electrical circuit board 9. In addition. In the sixth through ninth embodiments, the microcomputer 90, the blower controller 14, and the post-evaporator temperature sensor 55 are collectively mounted on the air-conditioning ECU 10, however in addition to them, at least any one of the electrical source circuit 49, the servomotors (the first actuator) 34–36 of the mode switching door 31–33, the servomotor (the second actuator) 18 of the A/M door 17, the servomotor 6 of the interior/exterior air switching door 5 and the potentiometer 19 may be mounted on the air-conditioning ECU 10.

In the above-described embodiments, the air-conditioning system is constructed so that the temperature sensitive portion 71 of the post-evaporator temperature sensor 55 directly contact the side surface of the evaporator 15 to detect temperature of the side surface of the evaporator 15. However, the temperature sensitive portion 71 of the post-evaporator temperature sensor 55 may directly contact a tube or a fin of the evaporator 15 so as to detect a surface temperature of the evaporator 15. Further, the temperature sensitive portion 71 of the post-evaporator temperature sensor 55 may be arranged inside the air passage 2 at an immediately downstream air side of the evaporator 15 so as to detect temperature of air after immediately having passed through the evaporator 15.

Further, not only the post-evaporator temperature sensor 55 for detecting temperature of air blown from the evaporator 15, but also a suction temperature sensor for detecting suction temperature of air sucked into the evaporator 15 or an air-outlet temperature sensor for detecting temperature of air blown from the air outlet may be disposed inside the air-conditioning duct 3. Furthermore, the suction temperature sensor and the air-outlet temperature sensor may be mounted on the electrical circuit board 9 or the air-conditioning ECU 10.

By the way, a body control other than air-conditioning control means electronic controls such as an electronic meter with a CRT display, multi-information by means of CRT, a compass, a light control, an intermittent wiper, lamp wire disconnection detection, a rear obstacle detecting device, a theft prevention device, a multiplex communication, a door lock, a power window, a power seat, a seat belt, a car navigation system. In addition, in the second through fifth embodiments, an example in which plural electrical members for an air-conditioning control are collectively arranged on the evaporator case cover 8, is described. However, even in a case where the electrical members are independently disposed respectively, the contact structure where the temperature sensitive portions 61 and 71 of the post-evaporator temperature sensor 55 contact the side surface of the evaporator 15 according to the second through the fifth embodiments may be applied. Even in this case, an improvement in the assembling workability can be obtained.

In the above-described embodiments, the multi-chip microcomputer in which entire functions such as CPU, ROM, RAM, and an I/O port are constructed by plural pieces of LSI is utilized; however, a single chip microcomputer in which such entire functions are constructed by a single piece of LSI, may be employed. In the mean time, SSI, MSI, or VLSI may be employed in place of single piece of LSI or a plurality of pieces of LSI in which CPU, ROM, RAM, an I/O port, and the like are integrated into one piece of integrated circuit chip for th air-conditioning control. In addition, EPROM or EEPROM may be utilized as ROM.

In the above-described embodiments, as air-conditioning control circuit members, only one chip CPU (a microprocessor) may be mounted on the electrical circuit board 9. In addition, the electrical members (sensors for an air-conditioning control such as a blower controller and the post-evaporator temperature sensor, and at least equal to or more than one piece of the actuators such as one piece or a plurality of pieces of servomotor) utilized for the air-conditioning control are integrally formed (concentrically arranged) with one board computer in which the air-conditioning control circuit members, an electrical circuit board (one board), the resisters and the capacitors are assembled into one lump.

The air-conditioning control circuit members may be constructed by one piece of LSI (a microcomputer) including functions at least CPU and memories (ROM, PROM, and RAM). Further, the air-conditioning control circuit members may be constructed by one piece of LSI (a microcomputer) including functions at least CPU and memories (ROM, PROM, RAM, and an I/O port).

In the above-described embodiments, the electrical control circuit for a vehicle air conditioner is constructed by the microcomputer 90 and the electrical circuit board 9 using as the electrical wiring board. However, the electrical control circuit such as an analogue integrated circuit (e.g., an operational amplifier or the like of operational amplifying IC) and a digital integrated circuit (logic IC, memory IC, or the like) for a vehicle air conditioner may be constructed by the air-conditioning control circuit members and the electrical circuit boards. In addition, in the above-described embodiments, the microcomputer 90 is incorporated with the A/D conversion circuit the (A/D converter) or the electrical source circuit; however, the A/D conversion circuit (the A/D converter) or the electrical source circuit may be constructed as a separate body from the microcomputer 90, and the A/D converter or the electrical source circuit may be mounted on the electrical circuit board 90. Further, a driver circuit for driving the actuator such as the servomotor may be constructed as a separate body from the microcomputer 90, and the driver circuit may be mounted on the electrical circuit board 90.

Such changes and modifications are to be understood as being within the scope of the present invention as defined by the appended claims.

What is claimed is:

1. An air-conditioning system for a vehicle having a passenger compartment, the air-conditioning system comprising:
    an air conditioning unit for controlling an air state to be blown into the passenger compartment, the air conditioning unit having an air duct defining an air passage through which air flows toward the passenger compartment;
    an electrical circuit board on which a plurality of control circuit members having at least functions of CPU and memory are mounted, the electrical circuit board being disposed integrally with the air duct;
    an electrical member which electrically operates when electrical power is applied thereto, and performs signal input/output operation between the control circuit members; and
    a cooling heat exchanger disposed in the air duct for cooling air passing through the air passage; wherein:
    the electrical circuit board is disposed in such a manner that at least the electrical member is cooled by the cooling heat exchanger; and
    the electrical member is mounted to the electrical circuit board.

2. The air-conditioning system according to claim 1, further comprising:
    a mode switching door for selectively switching an air outlet mode; and
    an air-mixing door for adjusting temperature of air blown into the passenger compartment,
    wherein the electrical member includes a first actuator for driving the mode switching door, a second actuator for driving the air-mixing door, and a position detection part for detecting a position of one of the first actuator and the second actuator.

3. An air-conditioning system for a vehicle having a passenger compartment, the air-conditioning system comprising:
    an air conditioning unit for controlling an air state to be blown into the passenger compartment, the air conditioning unit having an air duct defining an air passage through which air flows toward the passenger compartment;
    an electrical circuit board on which a plurality of control circuit members having at least functions of CPU and memory are mounted, the electrical circuit board being disposed integrally with the air duct;
    an electrical member which electrically operates when electrical power is applied thereto, and performs signal input/output operation between the control circuit members; and
    a cooling heat exchanger, disposed in the air duct, for cooling air passing through the air passage; wherein:
    the electrical circuit board is attached to a side surface of the cooling heat exchanger; and
    the electrical member is mounted to the electrical circuit board.

4. The air-conditioning system according to claim 2, wherein:
    the electrical member an least includes a heat-generating part which generates heat when electrical power is supplied thereto; and
    the heat-generating part is attached to contact the side surface of the cooling heat exchanger through an insulation member.

5. The air-conditioning system according to claim 4, further comprising
    a blower having a blower motor, for blowing air into the passenger compartment through the air passage,
    wherein the heat-generating part is a blower controller for electrically controlling the blower motor of the blower.

6. The air-conditioning system according to claim 2, wherein:
    the electrical member at least include a temperature sensor for detecting temperature of the cooling heat exchanger; and the temperature sensor is disposed to contact the side surface of the cooling heat exchanger.

7. The air-conditioning system according to claim 3, wherein:
the cooling heat exchanger has an interior fluid pipe for introducing interior fluid therein and for discharging interior fluid having been heat-exchanged with air; and
the electrical circuit board is attached at a detachable side of the interior fluid pipe of the cooling heat exchanger.

8. The air-conditioning system according to claim 3, wherein the electrical member includes a first electrical part for performing an electronic control of the air-conditioning unit, and a second electrical part for performing an electronic meter control, a multi-information control, a light control, an intermittent wiper control, a multiplex communication control, a door lock control, a power window control.

9. The air-conditioning system according to claim 3, wherein the electrical circuit board is disposed to form a part of the air duct.

10. An air-conditioning system for a vehicle having a passenger compartment, the air-conditioning system comprising:
a cooling heat exchanger for cooling air blown into the passenger compartment;
a cooler case for accommodating the cooling heat exchanger therein;
a case cover disposed in the cooler case at a side of the evaporator to cover an operation window opening of the cooler case;
an electrical circuit board on which a plurality of control circuit members having at least functions of CPU and memory, and an electrical member which electrically operates when electrical power is applied thereto and performs a signal input/output operation between the control circuit members collectively are mounted, the electrical circuit board being disposed integrally with an exterior wall surface of the case cover; and
a temperature sensor having a temperature-sensitive portion disposed to contact a side surface of the cooling heat exchanger; wherein:
the temperature sensor is mechanically attached to the electrical circuit board to be electrically connected with at least any one of the control circuit members and the electrical member.

11. The air-conditioning system according to claim 10, wherein:
the case cover includes a sensor-pressing portion for pressing the temperature sensitive portion toward the side surface of the cooling heat exchanger; and
the sensor-pressing portion is integrally molded with the case cover by a resin material, and is provided to be elastically deformed.

12. The air-conditioning system according to claim 10, wherein:
the case cover includes a sensor-pressing portion for pressing the temperature sensitive portion toward the side surface of the cooling heat exchanger; and
the sensor-pressing portion is disposed between an interior wall surface of the case cover and the temperature sensitive portion, and is made of a material to be elastically deformed.

13. The air-conditioning system according to claim 10, further comprising
a plate spring molded by a metal material on an interior wall surface of the case cover, and being disposed to be elastically deformed,
wherein the temperature sensitive portion of the temperature sensor is disposed to detect the temperature of the side surface of the cooling heat exchanger through the spring plate.

14. The air-conditioning system according to claim 11, further comprising
a seal member having an approximate round shape, the seal member being disposed from the sensor-pressing portion to an interior wall surface of the case cover, to prevent an air leakage to an outside of the case cover.

15. The air-conditioning system according to claim 11, further comprising
a flat seal member disposed between an exterior wall surface of the case cover and the electrical circuit board to prevent an air leakage to an outside of the case cover.

16. The air-conditioning system according to claim 11, further comprising
a lead wire for electrically connecting the temperature sensitive portion of the temperature sensor and any one of the control circuit members and the electrical member;
means for defining a penetrating hole through which an exterior wall surface and an interior wall surface of the case cover communicate with each other, the penetrating hole being provided at a position proximate to a board attachment portion of the exterior wall surface of the case cover, onto which the electrical circuit board is attached; and
a seal member disposed on the interior wall surface of the case cover to air-tightly cover the penetrating hole.

17. The air-conditioning system according to claim 10, wherein the electrical circuit board is disposed to form a part of the case cover.

18. An air-conditioning system for a vehicle having a passenger compartment, the air-conditioning system comprising;
an air-conditioning unit for controlling an air state to be blown into the passenger compartment, the air-conditioning unit having an air duct made of a first resin material for defining an air passage;
a housing formed separately relative to the air duct, the housing made of a second resin material having a thermal contraction smaller than that of the first resin material;
a plurality of control circuit members having at least functions of CPU and memory, the control circuit members being collectively disposed within the housing; and
an electrical member which electrically operates when electrical power is applied thereto, and performs signal input/output operation between the control circuit members.

19. The air-conditioning system according to claim 18, wherein:
the air-conditioning unit includes a mode switching door for selectively switching an air outlet mode, an air-mixing door for adjusting temperature of air blown into the passenger compartment, and a blower having a blower motor for generating an air flow toward the passenger compartment;
the electrical member includes a first actuator for driving the mode switching door, a second actuator for driving the air-mixing door, a potentiometer for detecting an opening degree of the air mixing door, a blower controller for electrically controlling the blower motor, and a sensor for detecting an air state; and the control circuit members are mounted on an electrical circuit board to electrically control the first servomotor, the second servomotor and the blower motor based on a detection value of at least any one of the potentiometer and the sensor.

20. The air-conditioning system according to claim 19, wherein the housing includes:

a circuit board case for accommodating therein the electrical circuit board on which the control circuit members and the blower controller are collectively disposed, and an actuator case for accommodating therein the potentiometer and any one of the first actuator and the second actuator.

21. The air-conditioning system according to claim 20, wherein:

the actuator case has a projection terminal portion;

the circuit board case has a recess terminal portion; and the projection terminal portion is disposed to be inserted into the recess terminal portion in such a manner than the actuator case and the circuit board case are electrically and mechanically connected to each other.

22. The air-conditioning system according to claim 20, wherein:

the actuator case has a projection terminal portion;

the circuit board case has a recess terminal portion; and the projection terminal portion is disposed to be coupled to the recess terminal portion through an electrical cable in such a manner than the actuator case and the circuit board case are electrically and mechanically connected to each other.

23. The air-conditioning system according to claim 19, wherein:

the control circuit members are mounted on the electrical circuit board disposed in a board receiving portion of the housing;

the air-conditioning unit includes a cooling heat exchanger for cooling air flowing through the air duct;

the sensor having a lead wire is disposed to detect a side surface temperature of the cooling heat exchanger;

the lead wire of the sensor is electrically connected to the control circuit members; and the board receiving portion has a through hole through which the lead wire penetrates.

24. The air-conditioning system according to claim 23, wherein:

the air duct has a cooler unit case for accommodating the cooling heat exchanger; and the housing is integrally attached to an exterior wall surface of the cooler unit case.

25. The air-conditioning system according to claim 24, wherein:

the electrical member at least includes a heat-generating part which generates heat when electrical power is supplied thereto;

the heat-generating part is attached to contact a side surface of the cooling heat exchanger through an insulation member; and the housing has a hole portion from which the heat-generating member is exposed into the cooler unit case.

26. The air-conditioning system according to claim 18, further comprising a blower for generating an air flow in the air duct, wherein:

the air duct includes an intake unit case for accommodating a centrifugal fan of the blower; and the housing is integrally attached to an exterior wall surface of the intake unit case.

* * * * *